United States Patent
Castro et al.

(10) Patent No.: US 10,984,519 B2
(45) Date of Patent: Apr. 20, 2021

(54) METHOD FOR EVALUATING THE OPTICAL INSERTION LOSS OF A MECHANICAL SPLICE JOINT OF TWO OPTICAL FIBERS

(71) Applicant: Panduit Corp., Tinley Park, IL (US)

(72) Inventors: Jose M. Castro, Naperville, IL (US);
Richard J. Pimpinella, Frankfort, IL (US); Yu Huang, Orland Park, IL (US);
Bulent Kose, Burr Ridge, IL (US);
William Kidd, Shorewood, IL (US)

(73) Assignee: Panduit Corp., Tinley Park, IL (US)

( * ) Notice: Subject to any disclaimer, the term of this patent is extended or adjusted under 35 U.S.C. 154(b) by 0 days.

(21) Appl. No.: 15/658,565

(22) Filed: Jul. 25, 2017

(65) Prior Publication Data

US 2018/0040117 A1 Feb. 8, 2018

Related U.S. Application Data

(60) Provisional application No. 62/370,379, filed on Aug. 3, 2016.

(51) Int. Cl.
*G06T 7/00* (2017.01)
*G02B 6/38* (2006.01)
(Continued)

(52) U.S. Cl.
CPC .......... *G06T 7/0004* (2013.01); *G01M 11/35* (2013.01); *G02B 6/3801* (2013.01); *G02B 6/3846* (2013.01); *G06K 9/4661* (2013.01); *H04N 5/2256* (2013.01); *H04N 5/23293* (2013.01); *H04N 5/232939* (2018.08); *H04N 5/332* (2013.01); *H04N 5/355* (2013.01);
(Continued)

(58) Field of Classification Search
CPC ....... G01M 11/35; G02B 6/3801; G02B 6/385
See application file for complete search history.

(56) References Cited

U.S. PATENT DOCUMENTS 6,677,591 B1 * 1/2004 Kim ................... G01M 11/0278
                                                      250/330
6,931,193 B2    8/2005 Barnes et al.
                         (Continued)

FOREIGN PATENT DOCUMENTS

WO    2016077054 A1    5/2016

*Primary Examiner* — Jayanti K Patel
*Assistant Examiner* — Christopher Kingsbury Glover
(74) *Attorney, Agent, or Firm* — Christopher S. Clancy; James H. Williams; Christopher K. Marlow

(57) ABSTRACT

A method for evaluating the optical insertion loss of a mechanical splice joint of two optical fibers with a laser source includes, upon initiation by a user, automatically performing the steps of: checking for ambient light, estimating the level of noise by analyzing an area of a sensor that is not illuminated by external sources and setting a noise threshold, checking self-alignment by taking a foreground image of the joint with the laser source turned on and one with it turned off, subtracting the images to obtain a resultant image, setting all pixels with levels below the noise threshold to zero, selecting a region of interest of the joint, computing a centroid and a width of the resultant image based on the region of interest, estimating a tilt and if the tilt is above a certain threshold, compensating for the tilt, and processing the resultant image.

2 Claims, 20 Drawing Sheets

(51) Int. Cl.
  *G01M 11/00* (2006.01)
  *G06K 9/46* (2006.01)
  *H04N 5/225* (2006.01)
  *H04N 5/33* (2006.01)
  *H04N 5/232* (2006.01)
  *H04N 5/355* (2011.01)
(52) U.S. Cl.
  CPC ............ *G06T 2207/10048* (2013.01); *G06T 2207/30164* (2013.01)

(56) References Cited

U.S. PATENT DOCUMENTS

| | | | |
|---|---|---|---|
| 6,984,077 B2 | 1/2006 | Bush et al. | |
| 7,192,195 B2 | 3/2007 | Turner | |
| 7,680,384 B2 | 3/2010 | Billman et al. | |
| RE42,094 E | 2/2011 | Barnes et al. | |
| 8,094,988 B2 | 1/2012 | Billman et al. | |
| 8,718,433 B2 | 5/2014 | Billman et al. | |
| 2005/0117856 A1* | 6/2005 | Huang | G02B 6/2551 385/96 |
| 2006/0074516 A1* | 4/2006 | Huang | G02B 6/2551 700/212 |
| 2007/0025681 A1* | 2/2007 | Turner | G02B 6/25 385/147 |
| 2009/0278962 A1* | 11/2009 | Richardson | H04N 5/335 348/241 |
| 2011/0146071 A1* | 6/2011 | Zheng | G02B 6/2552 29/869 |
| 2014/0226148 A1* | 8/2014 | Lane | G01M 11/31 356/51 |
| 2015/0063767 A1 | 3/2015 | Hallett et al. | |
| 2016/0133005 A1* | 5/2016 | Pimpinella | G02B 6/3801 348/88 |

* cited by examiner

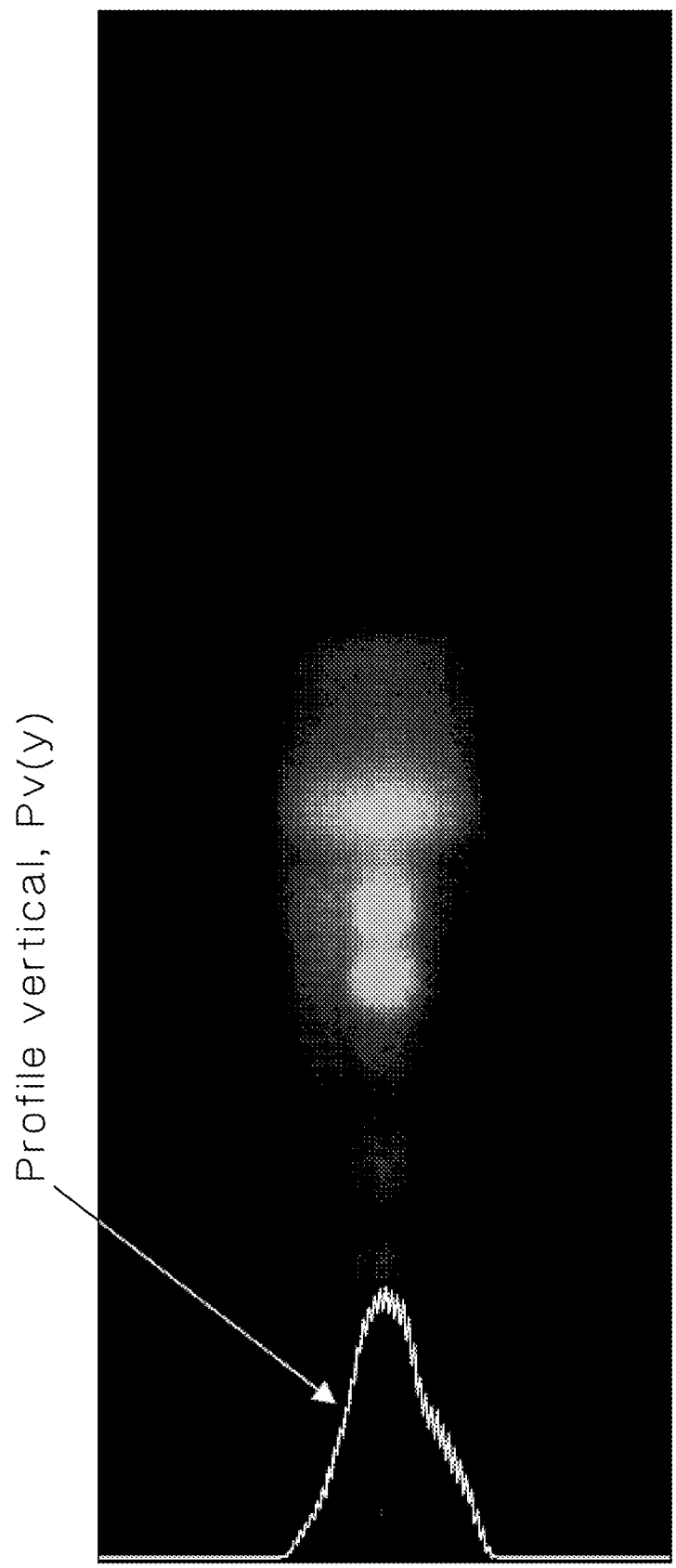

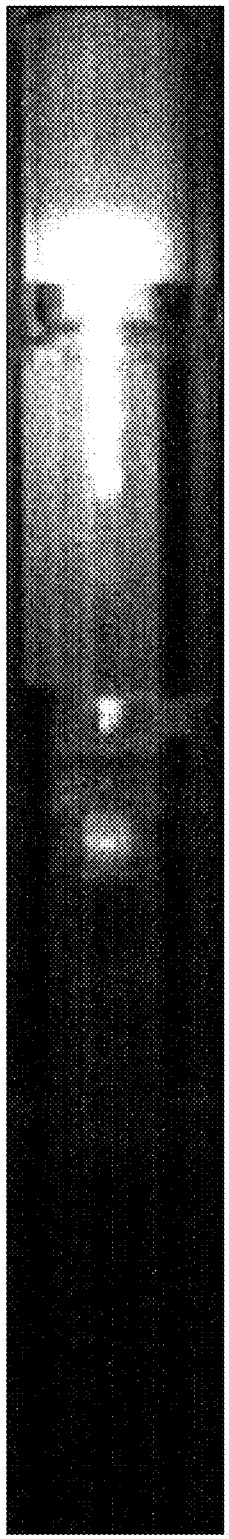
Fig.11A Image Low
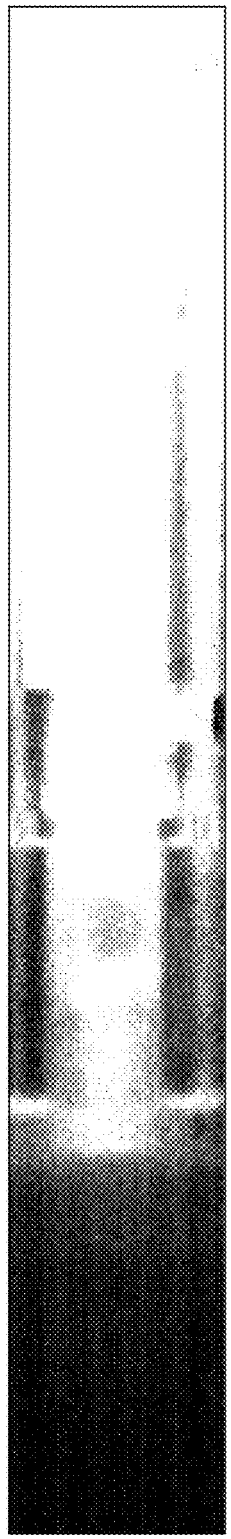
Fig.11B Image High
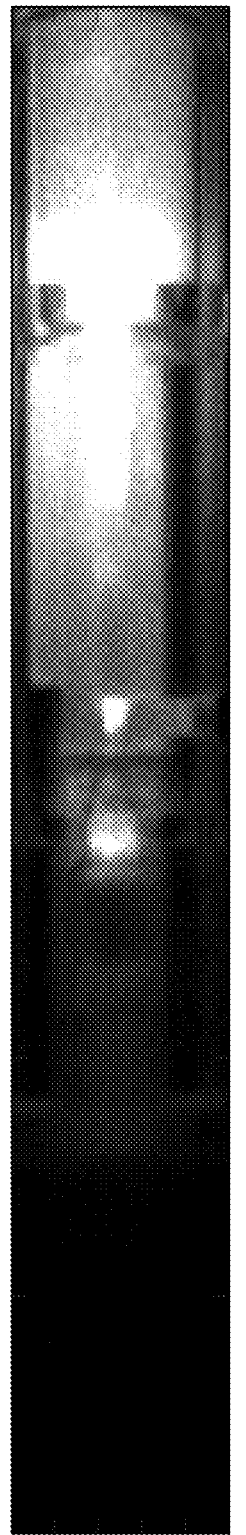
Fig.11C Image Combined

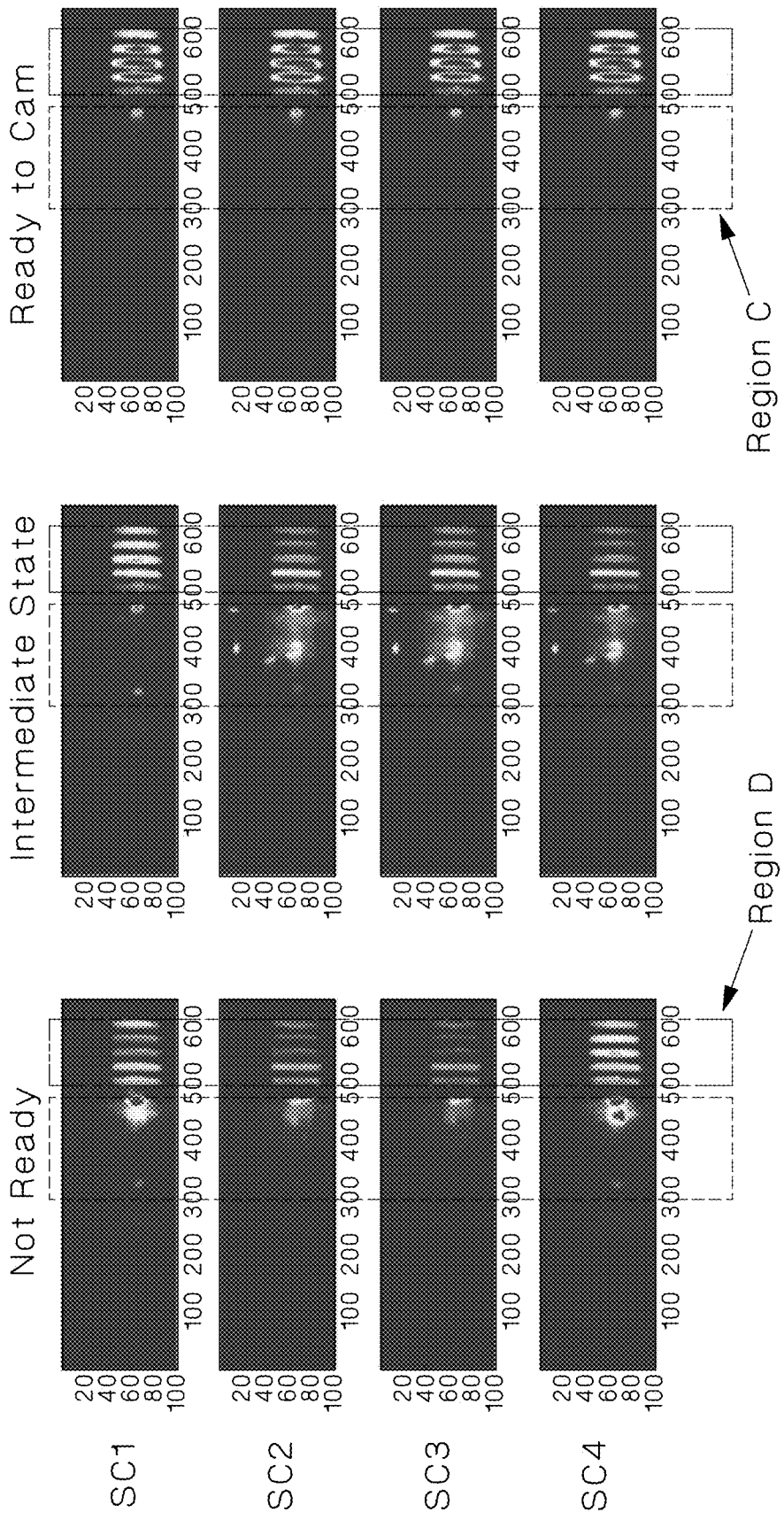

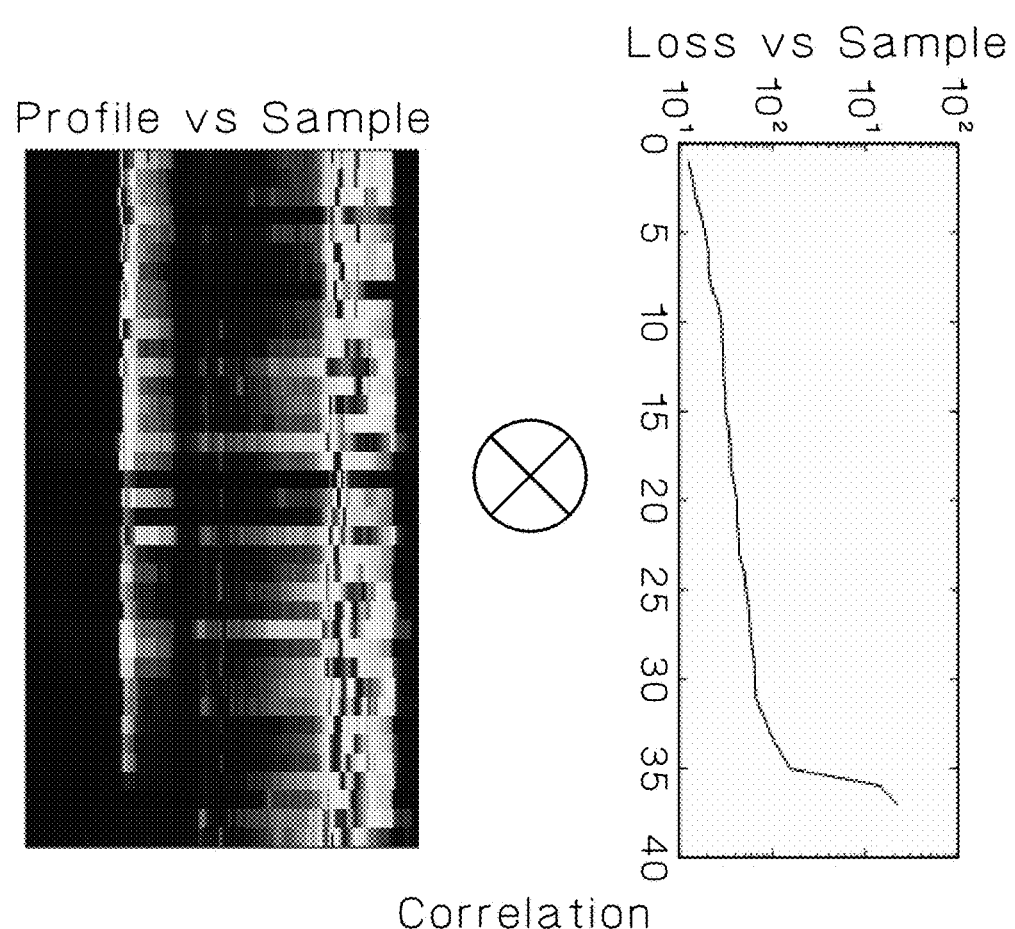
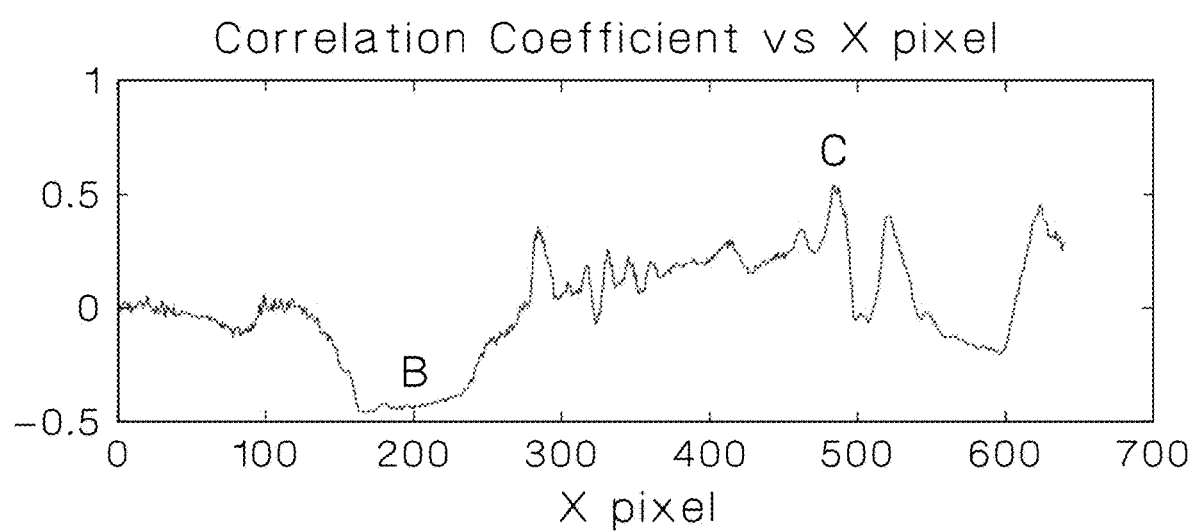
Fig.15

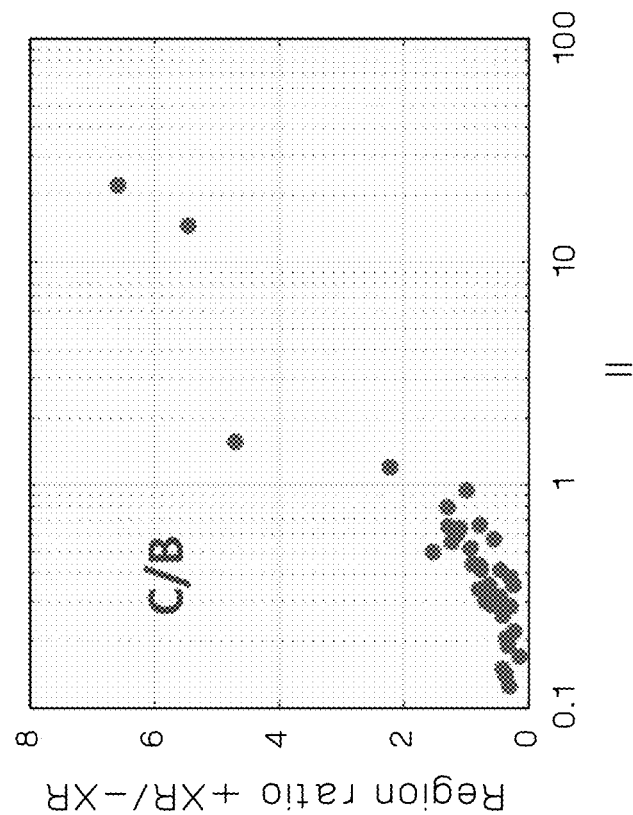
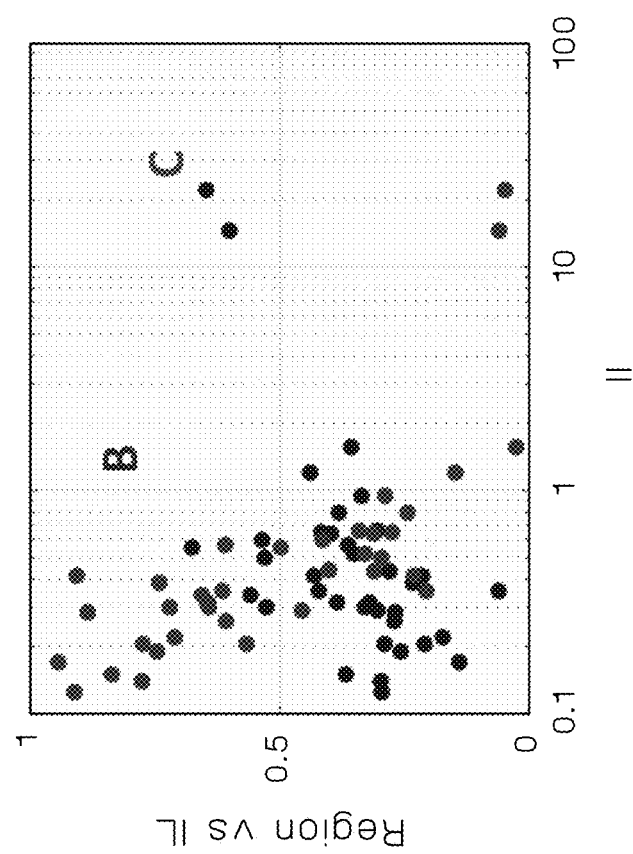
Fig. 16

METHOD FOR EVALUATING THE OPTICAL INSERTION LOSS OF A MECHANICAL SPLICE JOINT OF TWO OPTICAL FIBERS

CROSS REFERENCE TO RELATED APPLICATIONS

This application claims priority to U.S. Provisional Application No. 62/370,379, filed Aug. 3, 2016, the subject matter of which is hereby incorporated by reference in its entirety.

FIELD OF INVENTION

Embodiments of the present invention generally relate to the field of optical fiber splicing, insertion loss estimation, image processing, and more specifically to apparatuses and methods for evaluating the splice joints in mechanical splice terminations.

BACKGROUNDS

Current and future applications requiring high bandwidth channels favor the utilization of fiber optics links. Installation of fiber optic links can utilize pre-terminated or field terminated connectors. In the pre-terminated case, pre-specified fiber cable lengths are connectorized in the factory, where connectors are machine polished, tested, and certified to provide high performance. Field terminated links can follow different approaches: termination and polishing the connector in the field, utilize pre-terminated pigtails that can be spliced to the fiber link, or mechanical splice connectors. Field termination and polishing is unpractical and typically cannot match the quality of factory-polished connectors. Splicing factory terminated pigtails to the fiber link is a better approach which involves creating temporary or permanent joints between two fibers. In certain instances, the two fibers are precisely aligned and then fused together using localized intense heat oftentimes created with an electric arc. This is referred to as fusion splicing and is widely employed to create high performance permanent joints between two optical fibers. However, fusion splicer apparatuses are usually bulky, expensive, and relatively fragile, and splice joints must be protected and managed, typically in splice management trays or enclosures.

Alternatively, the mechanical splice connectors can provide low cost, fast installation, and high quality performance. In this approach the two fibers may simply abut one another in an alignment fixture often referred to as a mechanical splice. The alignment fixture may be an alignment tube, channel, or V-groove which receives two ends of separate fibers on either side and has the means of physically securing the fibers in place. In other instances, the alignment device may be a fiber optic connector with a stub fiber embedded therein and designed to connectorize a field fiber. In this case the field fiber can be terminated utilizing a mechanical splice to the stub fiber inside the connector.

In order to avoid significant loss of signal and reduce the potential reflectance or light leakage within these joints, users must ensure the field fiber is properly cleaved, there is precise alignment between the field and stub fibers, and that transparent gel or optical adhesive applied between the fibers matches the optical properties of the glass. However, these details are not always easy to detect and/or ensure. This uncertainty can result in connectors that have insertion loss (IL) values that exceed specified limits of the channel and therefore make them unsuitable for the required reaches, data rate, or bit error rate (BER) application.

A common used approach to ensure that the channel IL meets the specification, is to test the complete channel after installation. A measurement of the IL can be done using a power meter with methods shown in TIA or IEC standards, e.g., TIA, OFSTP-7 for single mode fiber (SMF) and IEC 61280-4-1 for multimode fiber (MMF), both of which are incorporated herein by reference in their entirety. Alternatively, the channel can be tested using an optical time domain reflectometer (OTDR), which uses the backscatter signature of the fiber to make an indirect measurement of fiber and connector losses. While OTDRs require only termination in one side of the link, they typically have poor spatial resolution making it difficult to resolve the discrete losses of closely space connectors, and are relatively expensive devices. Moreover, OTDRs have several technical disadvantages. They require a long launch cable to mitigate the dead-zone effects, and can have significant inaccuracies due to the mismatch in fiber light backscattering, diameter, and mismatch in numerical apertures of the fibers used in the link. To improve the OTDR's accuracy, measurement from both sides of the link are required. However, this negates its main advantage of performing measurements from one end of the cable.

Therefore, there is a need for apparatuses and methods directed towards helping to reduce cost and improve channel performance of the fiber optics link.

SUMMARY

Accordingly, disclosed herein are embodiments directed towards apparatuses, methods, and systems which assist and guide an installer during the termination of a field optical fiber to a field-terminable connector, and help determine and record IL after termination. In certain instances, the apparatus can also transmit data to an aggregate database to help manage and record installation data.

In one embodiment, the present invention is a method for evaluating the quality of a mechanical splice joint, wherein the method includes coupling light into a pre-terminated connector and a field fiber, and evaluating digital images of the scattered light pattern from at least a portion of the mechanical splice joint and the optical fibers.

In another embodiment, the present invention is an apparatus and method for assisting in the termination of a mechanical splice joint comprising a visible or infrared light source, digital camera, digital signal processor, optical filter, and visual indicator. The apparatus may not require any cover to block environmental ambient light, enabling a simple, reliable, and fast installation process. A microcontroller runs a series of algorithms to perform ambient light background subtraction, multi-exposure dynamic range compensation, and feature extraction. These algorithms enable real-time operation assistance from the moment an installer starts inserting a field fiber into the mechanical splice, and ends with a final insertion loss estimation once the fiber termination is completed.

In another embodiment, the present invention is an apparatus for evaluating the quality of a mechanical splice joint comprising a light source, digital camera, digital signal processor, memory, and visual indicator wherein the apparatus connects to the pre-terminated connector and the digital signal processor analyzes digital images of the scatter light from at least a portion of the pre-terminated connector and at least one time during the installation.

In another embodiment, the present invention is an apparatus and method for evaluating the quality of a mechanical splice joint wherein the method subtracts digital images of the ambient background from the scattered light of the connector, and adjusts the level of exposure of the camera in order to avoid saturation or low signal to noise ratio (SNR). The method may also utilize multi-exposure images to produce a final image with increased dynamic range, in order to estimate if the connection between the source to the field terminator connector is dirty or damaged, or if the background ambient light is too high and requires a cover in order to perform the test.

In another embodiment, the present invention is a method for evaluating if the terminated connector insertion loss passes or fails a specified IL limit, wherein the method includes the coupling light into said connector and field fiber, and digital images of a scattered light pattern from at least a portion of the mechanical splice joint and the optical fibers are analyzed and evaluated.

In another embodiment of the present invention the apparatus includes a Bluetooth or other wireless communication interface to enable communication to a portable or handheld device such as a smartphone, wherein the portable device contains a resident application for providing a user interface to said apparatus for collecting and communicating connector installation data, and may also include splice analysis firmware.

In another embodiment of the present invention, a mobile or centralized system collects data from one or more apparatuses according to the present invention to log and/or communicate current progress of the project installation, trends, risk, and estimated IL of the installed connectors.

These and other features, aspects, and advantages of the present invention will become better understood with reference to the following drawings, description, and any claims that may follow.

BRIEF DESCRIPTION OF THE DRAWINGS

FIG. 8 illustrates a flow diagram representative of an exemplary Profile Vertical algorithm.

FIGS. 11A, 11B, and 11C illustrate the effect of image combination and dynamic range enhancement algorithm.

FIGS. 13A, 13B, and 13C illustrate the ready to cam methodology.

FIG. 15 illustrates the computation of pixels with high correlation or anti-correlation in the image sensor.

FIG. 16 illustrates the correlation of pixels with IL.

FIG. 17 illustrates a displayed image when the apparatus is turn on.

DETAILED DESCRIPTION

Figure 1:
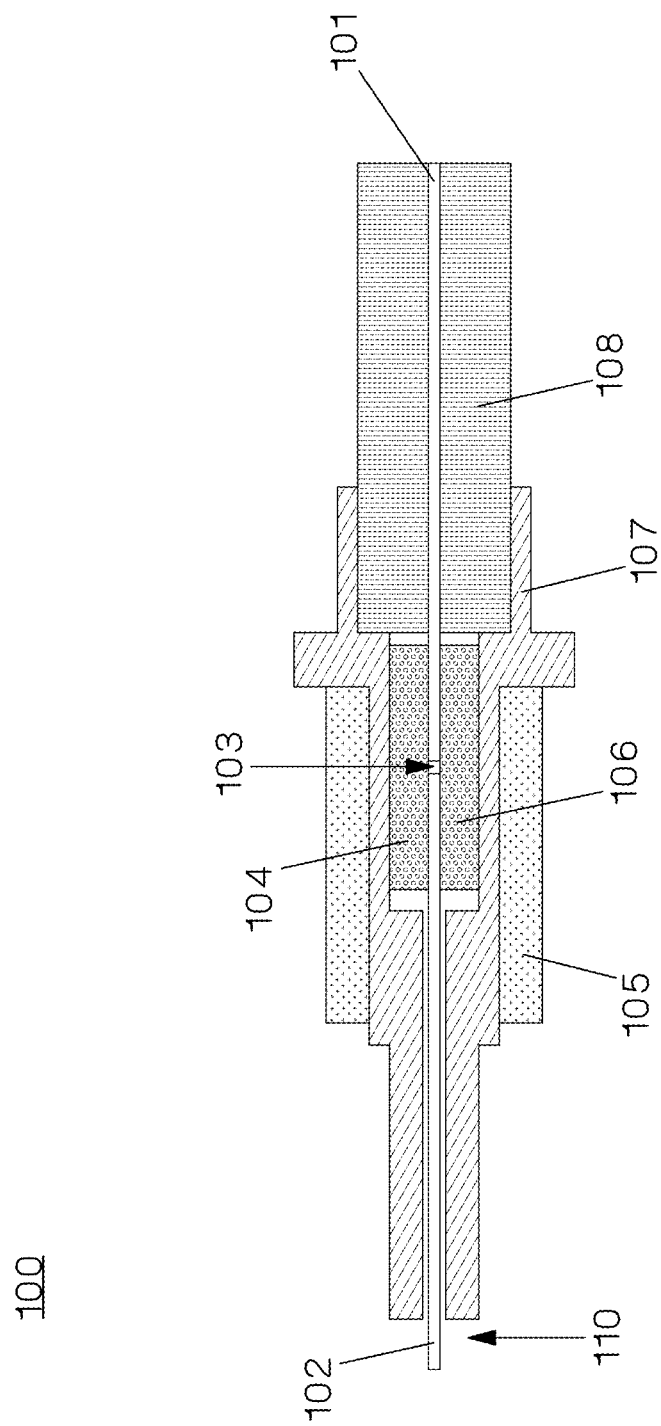
FIG. 1 illustrates a side cut-away view of a field terminated fiber optic connector with a stub fiber.

Mechanical splicing often occurs when a field optical fiber is connectorized to a pre-manufactured fiber optic connector with a stub fiber embedded therein. An example of such a connector is shown in FIG. 1. Connector 100 generally includes a ferrule holder 107 with a ferrule 108 positioned at the front end thereof, and a top plank 104 and a bottom plank 106 positioned between the ferrule 108 and a distal end 110 of the connector. The connector 100 includes a stub fiber 101 which is typically embedded in the optical connector at the time of manufacture. The stub fiber 101 extends from the outer edge of the ferrule (which can later interface a corresponding adapter) to the inner portion of the connector in the general area of the top and bottom planks 104, 106. To splice the stub fiber 101 with a field fiber 102, a user inserts the field fiber into the connector 100 through its distal end 110, aligns both fibers accordingly, and activates a cam 105 to clamp the field fiber and the stub fiber in place, forming a stub fiber/field fiber interface 103 (also referred to as a splice joint). Ensuring that light leakage and reflection are reduced or minimized at these joints is essential for a well-executed splice. Accordingly, the present invention may help a user with proper splicing of two fibers.

Figure 2:
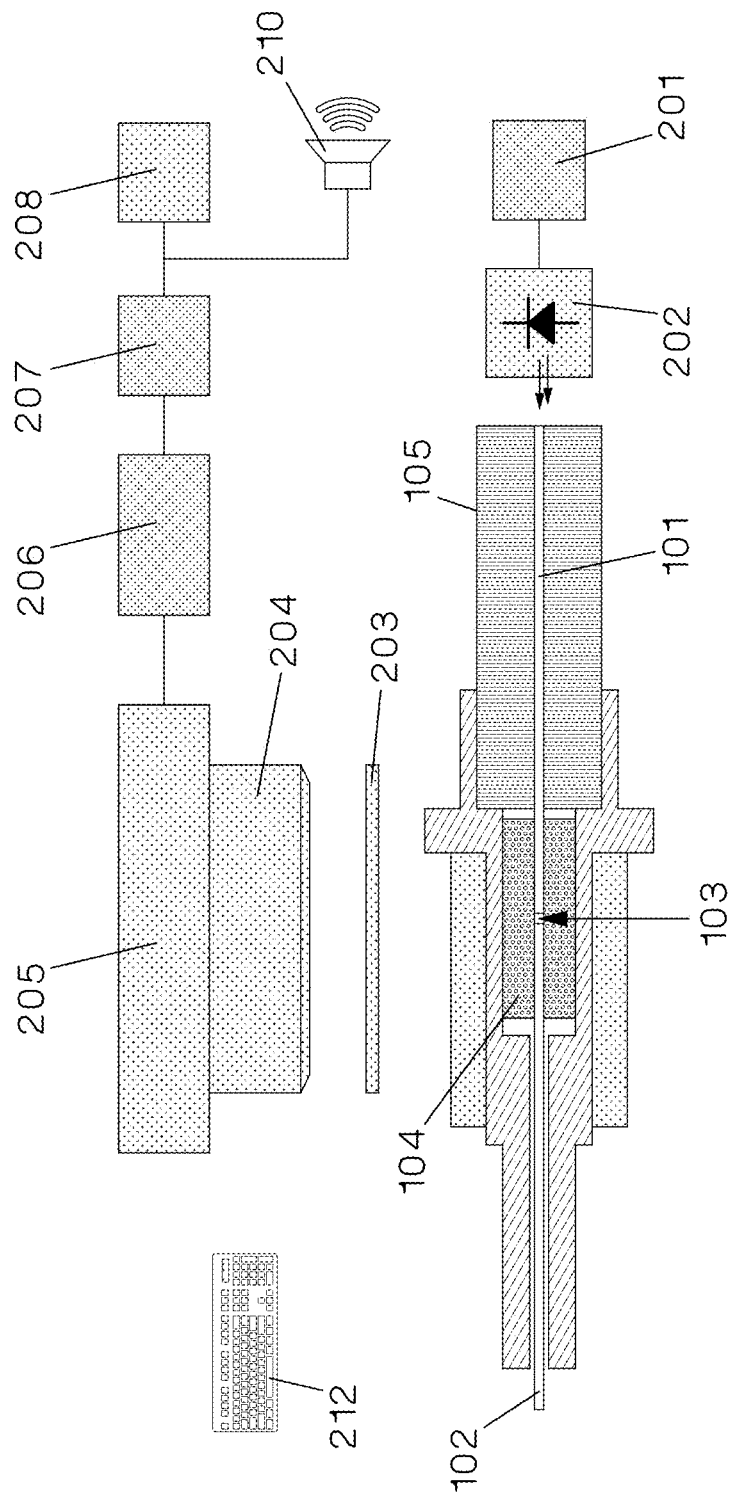
FIG. 2 illustrates a side cut-away view of one embodiment of the present invention.

In one embodiment shown in FIG. 2, the present invention is an apparatus which can help a user terminate a field fiber to a pre-polished connector stub fiber and test the quality of the resulting splice joint. The termination and test apparatus comprises an electronic driver 201 to generate continuous or pulsed signals to a visible or infrared light source, an LED or laser device 202 that launches light to an optical fiber ferrule using free space optics, such a lenses, diffractive elements, or using a launch optical patch cord, an optical filter 203 which can operate as a bandpass filter for specific regions of the optical spectrum, e.g., 850 nm, an optical lens or diffractive element 204 to direct and focus the light towards an imaging device such as a camera sensor, an array of optical detectors, or a digital video camera 205, which can optionally have the infrared stopband filter removed and the infrared bandpass filter attached, a microcontroller or processor 206 for image acquisition and for controlling all functionalities of the apparatus, including a user input device, e.g., a keyboard 212, or an output device such as a visible or audible transducer 208 and 210, respectively. An apparatus according to the present invention, may also include a display unit to assist the user during the installation process and to indicate a pass/fail termination condition. The apparatus may also have provisions for communicating with other devices by means of a Bluetooth, Wi-Fi, or other wireless device 207, using wireless communication protocols for remote control and/or uploading connector installation data.

The connector under test 100 is positioned such that splice joint 103 is located essentially within the field of view of digital video camera 205. Light source 202 can include a semiconductor laser capable of emitting light having a spectral range within the optical sensitivity of the video camera, typically between about 450 nm to 630 nm for visible operation or between 700 nm to 1700 nm for infrared operation. The optical source is capable of launching light into the stub fiber when engaged with the connector under test. When the user turns on the device, power is supplied to all necessary power-consuming components such as, but not limited to, the light source 202, digital video camera 205, processors and electronics 206, 207, and user visual/sound interface 208, 210. The spatial pattern of the scattered light emanating from multiple regions of the connector 100 passing through the filter 203 and focusing optics 204 is imaged by video camera 205 and the images are analyzed by 206 utilizing digital signal processing algorithms disclosed in this application.

Figure 3:
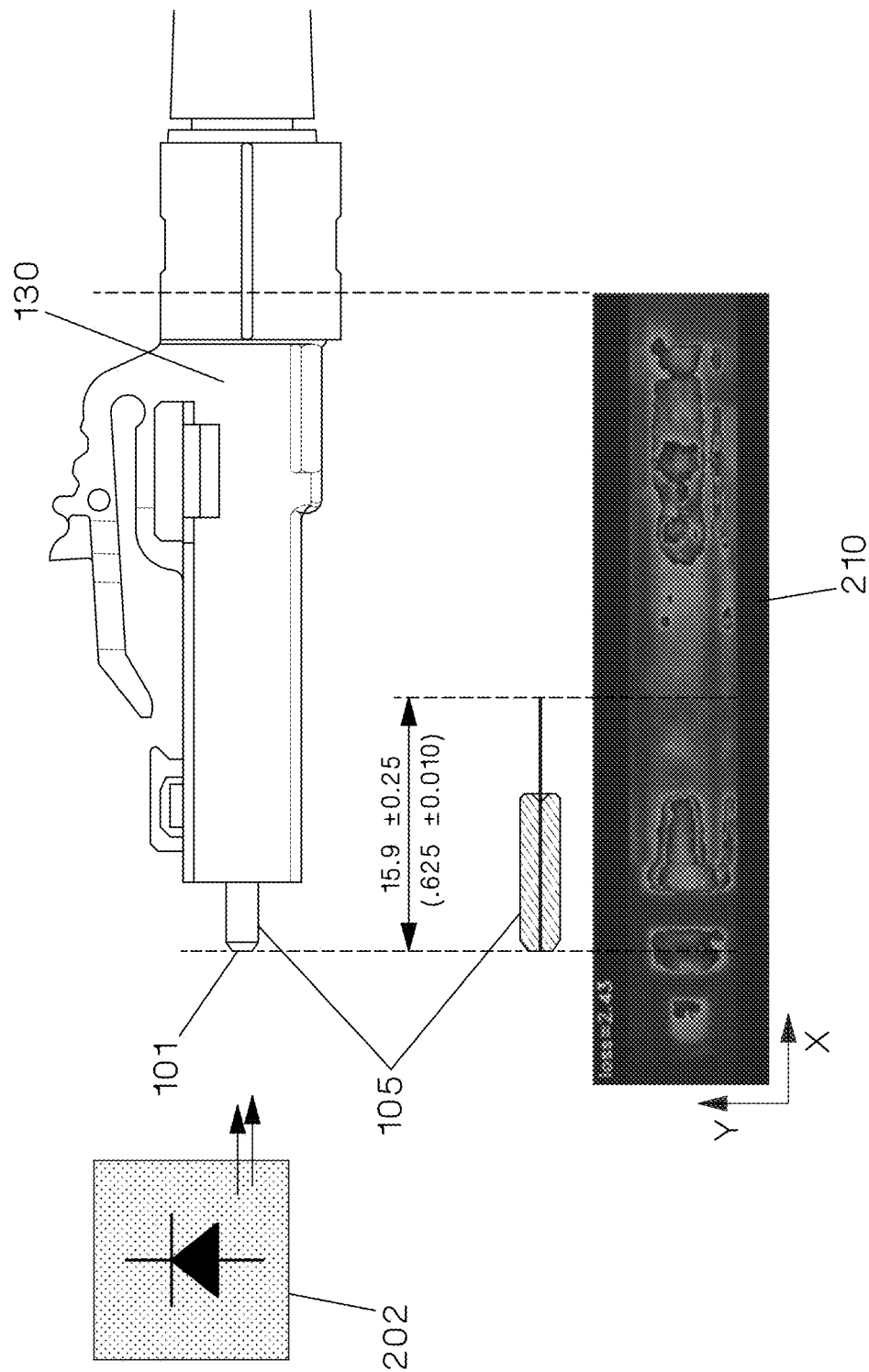
FIG. 3 illustrates a typical image of a field terminated fiber optic connector when light is launched into the stub fiber.

The prepared field fiber 102 can be joined to the stub fiber inside test connector 100 with the assistance of the presented apparatus and method. While field fiber 102 is being inserted, the apparatus continuously captures images of the scattered light pattern and analyses the digital images from at least two regions of the test connector 130 which includes splice joint 103 and the field fiber 102. FIG. 3 shows a typical image 210 of an OptiCam® LC connector 130, captured using an 8-bit black & white camera with 640×480 x-y pixel resolution. For the configuration represented here, only 100 pixels along the y-axis are considered.

Figure 4A:
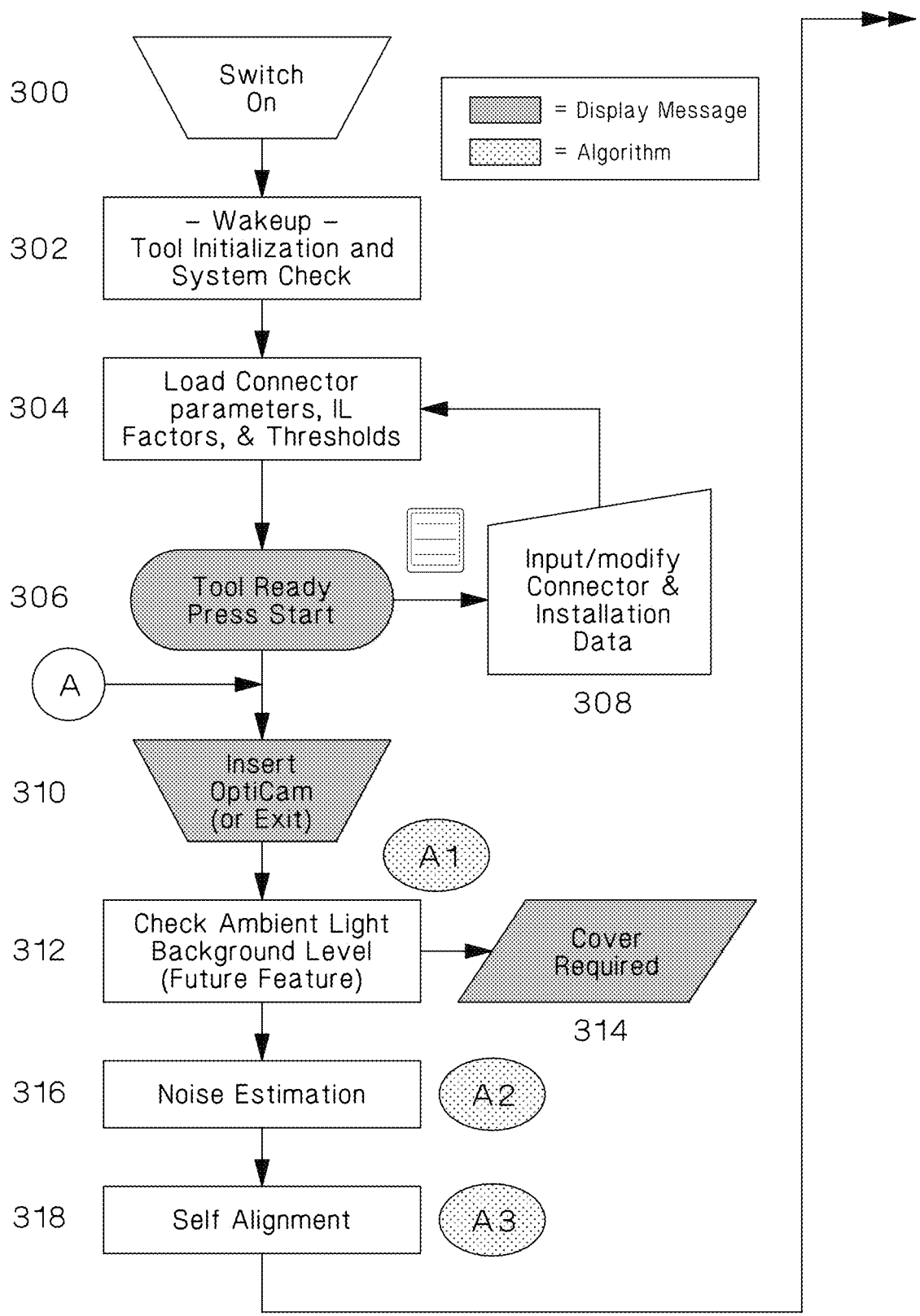
FIGS. 4A, 4B, and 4C illustrate a flow diagram representative of a method according to an embodiment of the present invention of assisted field fiber termination and insertion loss (IL).
Figure 4B:
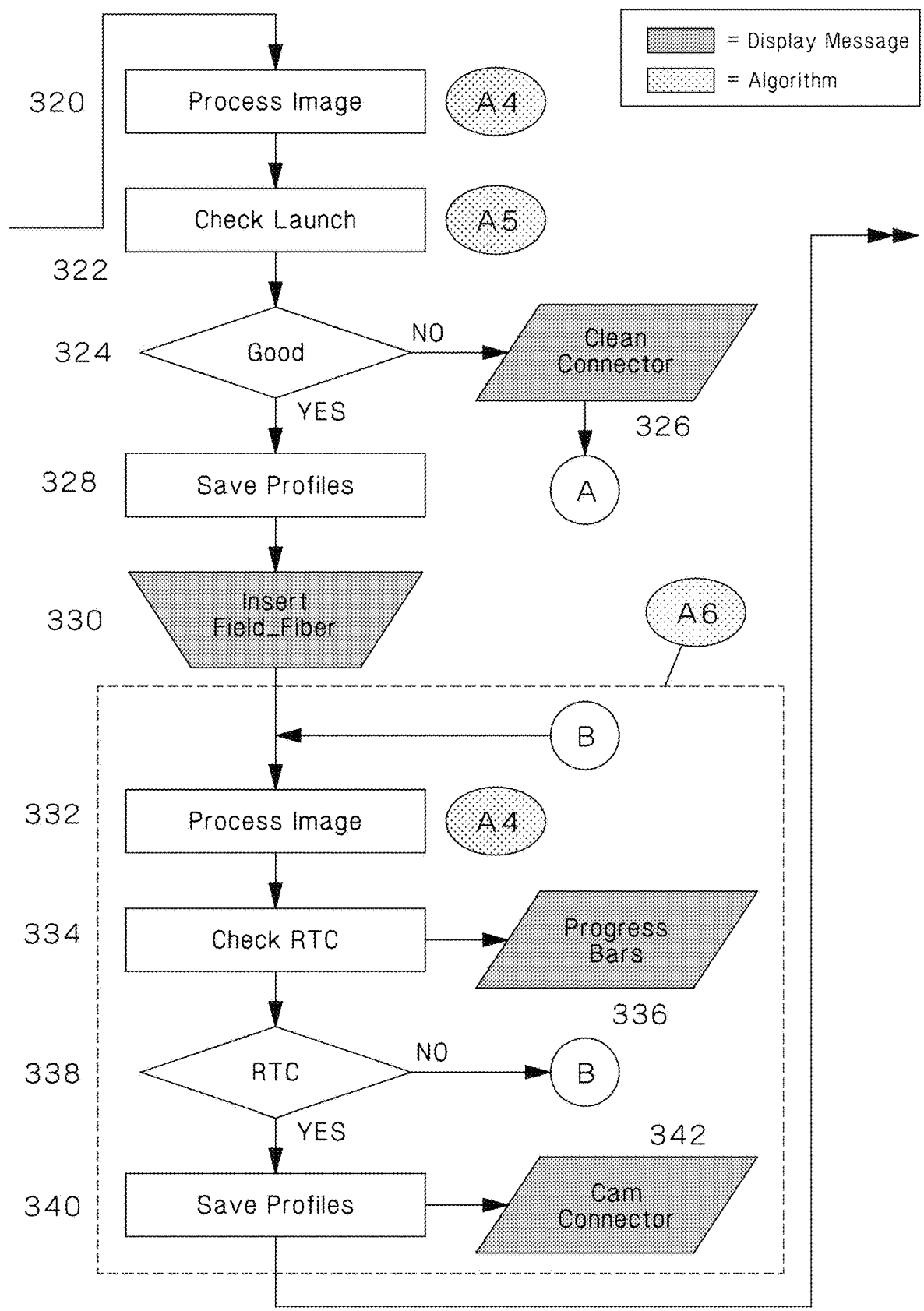
Figure 4C:
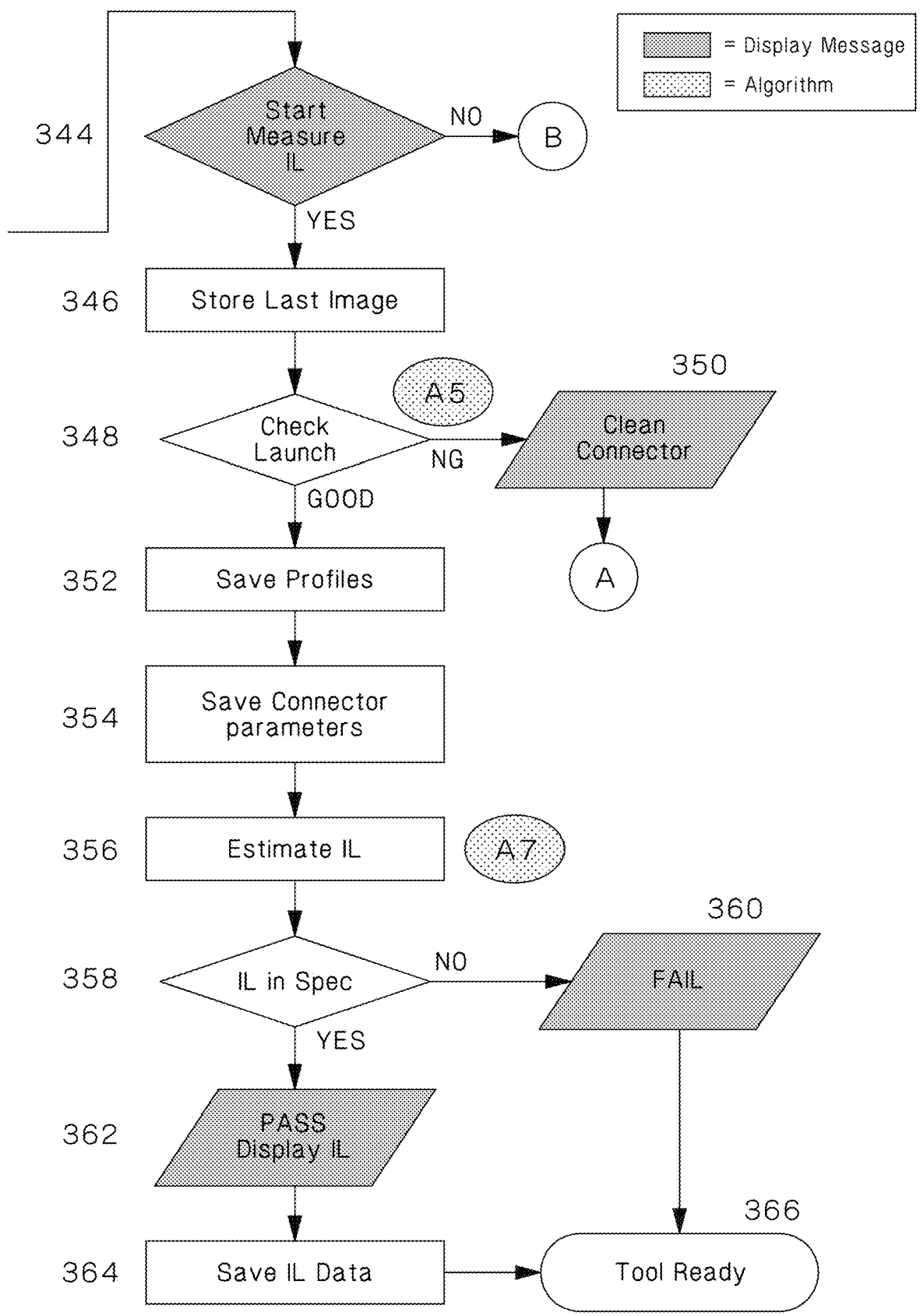

As a field fiber is inserted, a series of images at different stages of the termination process are captured, corrected and analyzed by the apparatus in order to provide real-time monitoring, termination assistance, and IL estimation. FIG. 4 shows a flow chart representative of an exemplary method used to assist during installation and to evaluate the connector insertion loss.

The process shown in FIG. 4 starts in step 300 when the equipment is turned on by the operator. In 302, the apparatus runs an initialization routine which includes checking the proper operation of its electronic components such as microcontroller, camera, laser output level, flash memory, etc. In 304 the main parameters used in the algorithms of the method are loaded into local memory. These parameters can include variable assignation for each type of connectors, calibration constants, default resolution of the camera, default exposure time, default gain, default frame rate, noise thresholds, x-y coordinate for locations in the sensor to compute dark current, x-y coordinate for reference points in the sensor, decision threshold for image localization, decision thresholds for tilt correction, initial scaling factors, decision thresholds for RTC acceptance for each type of connector, decision and threshold factors for illumination, sleeping time constants, variables for maximum number of iterations in RTC process, and many others. In 306, the apparatus displays a message indicating the apparatus is ready for operation and provides the operator with the option to change default values such as connector type, pass/fail spec limits, or other relevant parameters. If necessary, in 308 the operator uses an input device to change one or more default parameters. In 310 the operator receives a display message to insert the pre-terminated optical connector and connect the optical source to the connector ferrule. At this point, the user also has the option to terminate the process.

In 312 the apparatus runs algorithm A1, which checks the environmental ambient illumination levels without laser illumination, and compares levels to threshold levels already loaded in 304. This is done by measuring the background levels of ambient light reaching the sensor. If the measurement is greater than a specified threshold, the apparatus outputs a message indicating that a cover is needed to shade the connector (or ambient light needs to be reduced in some other manner) in order to accurately estimate low insertion loss values. Under most operating conditions of at least 1500 lux for indoor illumination (fluorescent or LED lighting devices), the threshold value is high enough to enable operation without a cover.

Next, in 316 the apparatus runs algorithm A1, which checks the background noise in non-illuminated areas of the sensor. The noise level of the optical imaging system is estimated by analyzing a small region of the sensor that is not illuminated by external optical sources. Then, the maximum and standard deviation of the noise, as well as the histogram is estimated. The noise is recorded as a variable, i.e., NOISE_TH, in memory and used by other algorithms as a threshold to clean the image.

Figure 5:
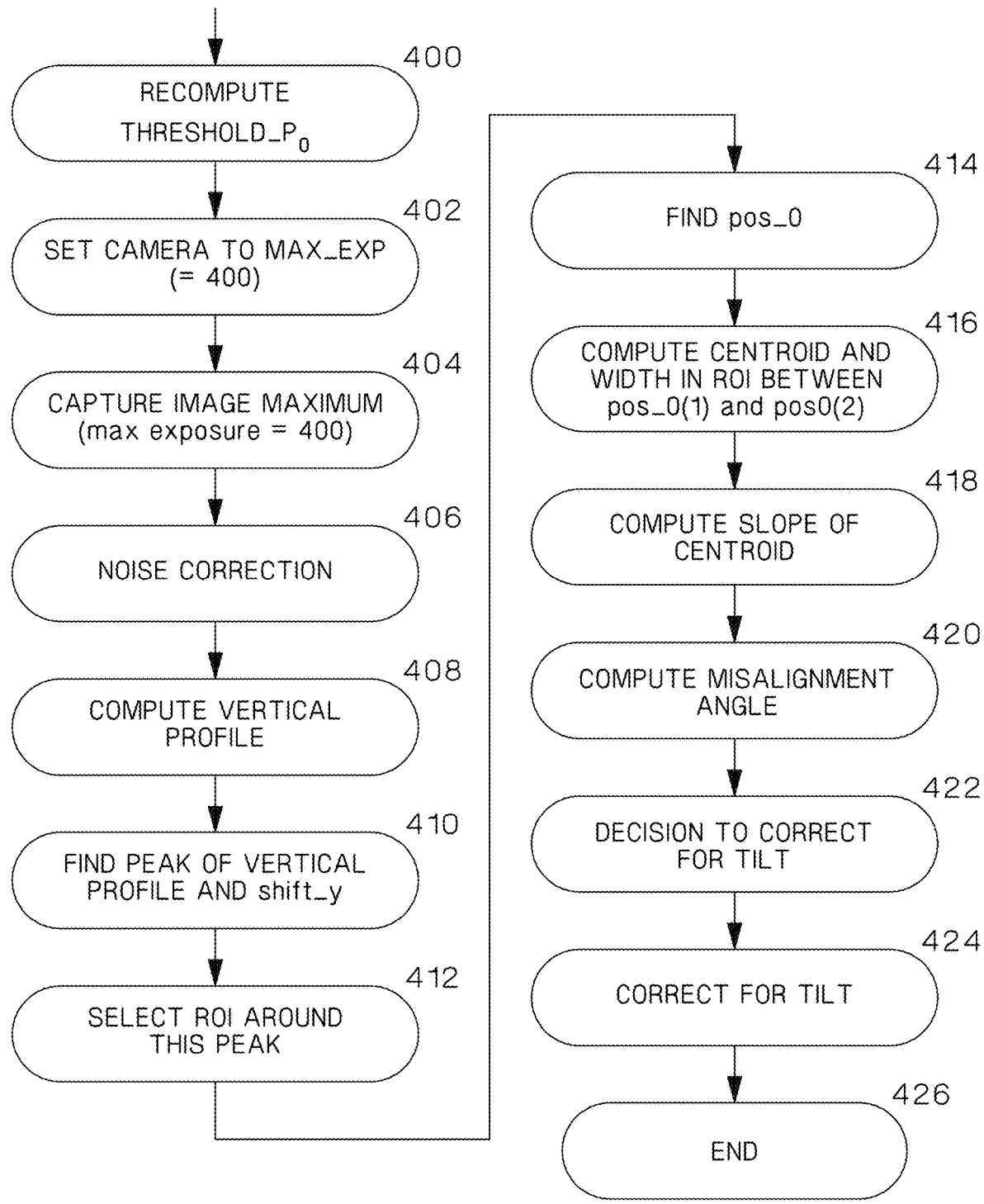
FIG. 5 illustrates a flow diagram representative of an exemplary Self-Alignment algorithm.

Next in step 318, the position, tilt and scale factors of the connector image in the sensor are estimated using algorithm A3. In order to reduce manufacturing and assembly costs, the mechanical tolerances of the apparatus such as lateral and angular offsets, height, sensor and lens relative position, length defocus, and scaling factors can be relaxed. Hence, prior to step 318 the precise location and orientation of the image on the sensor, and the exact value of these parameters are unknown. The self-alignment algorithm, represented in the flow chart of FIG. 5, is used to locate the position of the connector image on the sensor, correct for any lateral offsets or axial tilt, and estimates the visual magnification of the object with respect to its image in the sensor. The parameters obtained from this algorithm are required for the subsequent algorithms shown in the chart of FIG. 4 for accurate image analysis and connector performance estimation.

Referring to FIG. 5, the estimation of these parameters begins in step 400, where the noise of the sensor, NOISE_TH, which was estimated during the execution of algorithm A2, is used to determine a threshold required to identify the location of the connector in the sensor, labeled here THRESHOLD_P0. For example, a factory calibration factor, (loaded in step 304) can be used to multiply the parameter NOISE_TH.

Figure 7A:
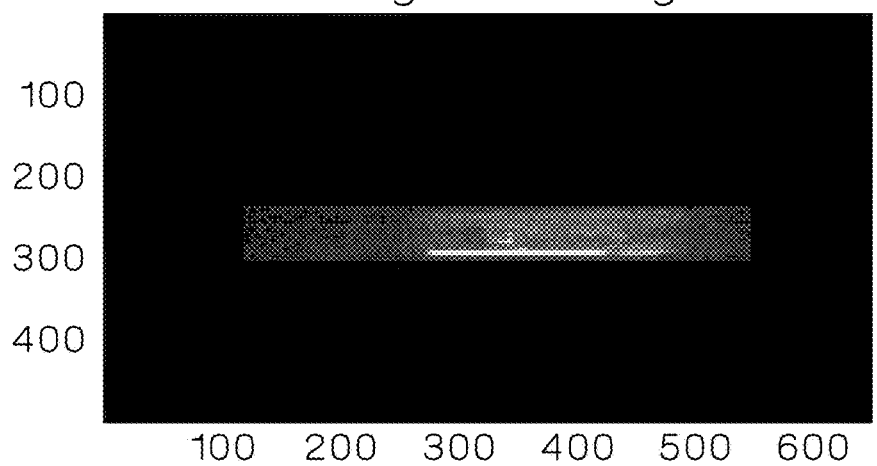
FIGS. 7A, 7B, and 7C illustrate a flow diagram representative of an exemplary Background Subtraction algorithm.
Figure 7B:
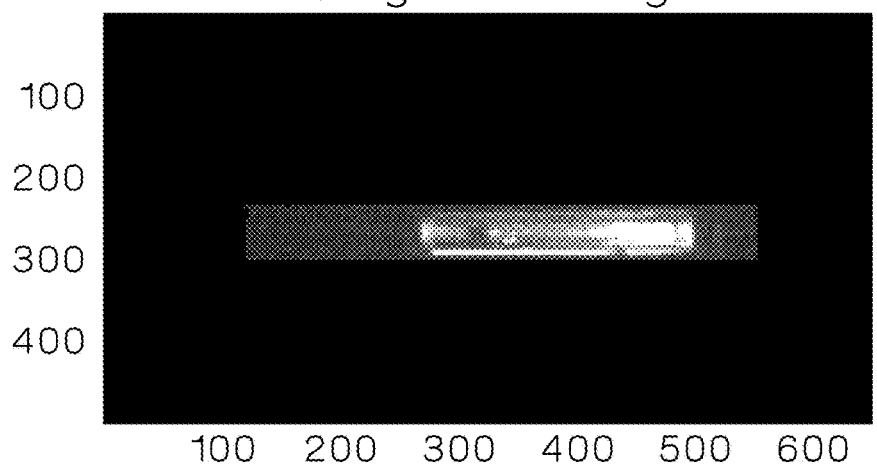
Figure 7C:
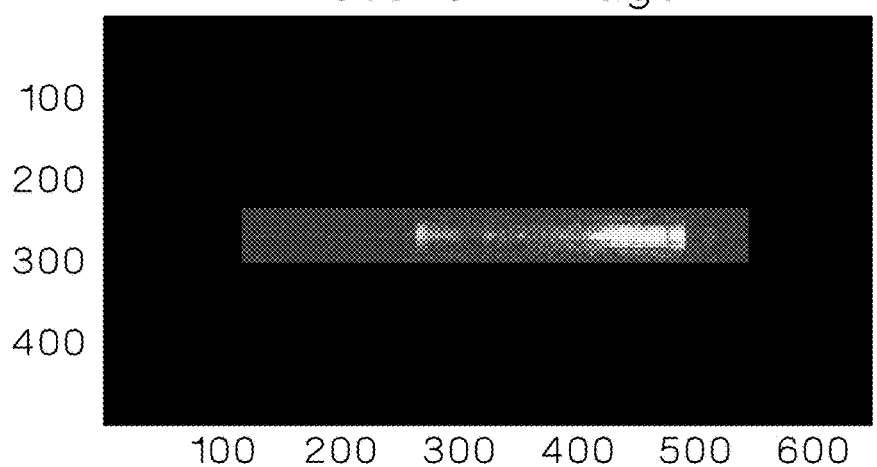

In step 402 the camera is set to the maximum exposure time and in step 404 two images are captured. The first image is acquired with the optical source turned off. This image is labeled background image. The second image capture occurs with the optical source turned on. The later image is labeled foreground image. Next, the background image is subtracted from the foreground image resulting in a resultant image. An example of each of these images is shown in FIG. 7. In step 406 the effects of noise in the image analysis are minimized by setting all pixels with level values below the NOISE_TH to zero. In step 408 the y-axis profile or vertical profile of the image is computed using:

$$PV(y) = \text{mean}_x(I(x,y))$$

where, I (x, y) is the image array. An example of the PV(y) calculation is shown in FIG. 8.

In 410 the centroid of PV(y) is computed using:

$$\text{cent\_y} = \frac{\sum_y y PV(y)}{\sum_y PV(y)} \qquad (1)$$

or alternatively using cent_y=$\max_y$(PV(y)).

In step 412, the value of cent_y is used to select the region of interest (ROI) in the sensor that covers the image of the connector along the y-axis. This reduces the number of y-axis pixels to be utilized in the subsequent computations. For example, for a sensor with 640×480 pixels, after the y-axis ROI is found, only 640×100 pixels are used. Next, in 414 the profile average of the image is computed using:

$$PA(x) = \text{mean}_y(I_{ROI}(x,y))$$

where, $I_{ROI}(x, y)$ is now the ROI selected from the sensor image. The start and end of the connector image is computed using the following procedure:

a. From the left side of the image (x=0), find the first value of x where $PA(x) \le THRESHOLD\_P_0$ and $PA(x+1) \ge THRESHOLD\_P_0$. Store this position as pos_0(1).

b. From the right side of the image (x=640, for a 640×480 sensor) find the first x where, $PA(x) \le THRESHOLD\_P_0$ and $PA(x-1) \ge THRESHOLD\_P_0$. Store this position as pos_0(2).

Then, in step 416, the centroid(x) and width(x) are computed using:

$$\text{centroid}(x) = \frac{\sum_y y\, \text{image\_h}(y, x)}{\sum_y \text{image\_h}(y, x)} \quad (2)$$

$$\text{width}(x) = \sqrt{\frac{\sum_y (y - \text{centroid}(x))^2 \text{image\_h}(y, x)}{\sum_y \text{image\_h}(y, x)}} \quad (3)$$

and the number of pixels that represent the connector in the sensor is computed using:

$$n\_pixels = (pos\_0(2) - pos\_0(1)) \quad (4)$$

Thereafter, the ratio of n_pixels with a design parameter loaded in 304 are used to computer the scaling factor.

$$\text{scaling\_factor} = \frac{n\_pixels}{n\_ref} \quad (5)$$

Figure 9:
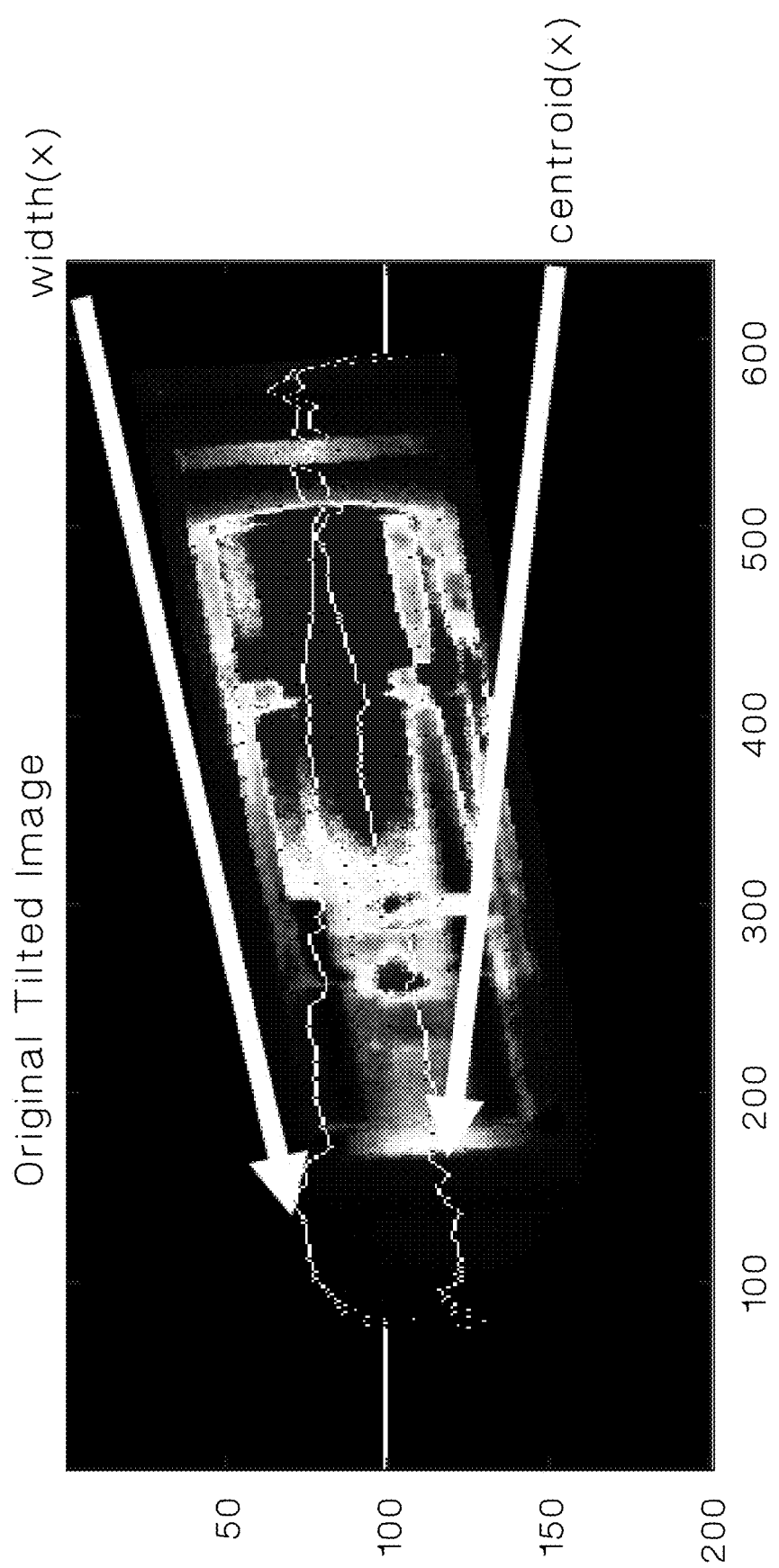
FIG. 9 illustrates centroid and width function calculation.

The value of the design parameter assumes an apparatus with tight tolerances, where the image is in focus. The scaling factor is stored and to be used by the RTC and IL algorithms (A6 and A7). In the next steps, which is the tilt estimation algorithm, it is assumed that the object plane is tilted with respect of the sensor plane as shown in FIG. 9. This figure shows the centroid(x) and width(x) computed in 416.

In step 418, the slope of the centroid(x) is computed using:

$$\text{slope} = \frac{n\_pixels \sum_x \text{centroid}(x) x - \sum_x \text{centroid}(x) \sum_x \text{centroid}(x)}{n\_pixels \sum_x x^2 - \left(\sum_x x\right)^2} \quad (6)$$

and in step 420, the angle of tilt, angle_d is computed from the slope using:

$$\text{angle\_d} = a\tan(\text{slope}) \times \frac{180}{pi} - ANGLE\_BIAS \quad (7)$$

where, ANGLE_BIAS is a factory calibration parameter loaded from memory in step 304.

Figure 10A:
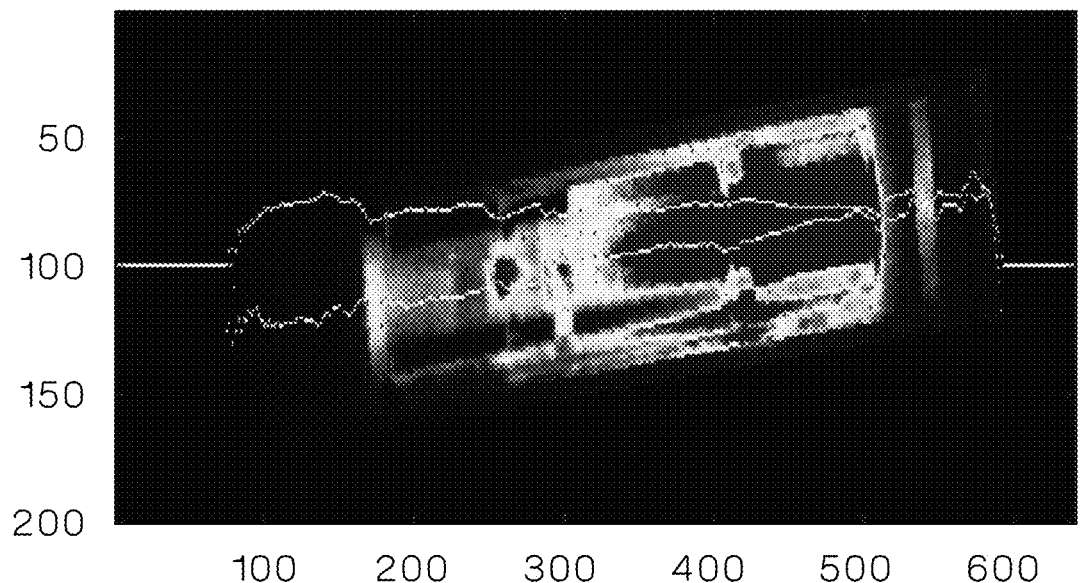
FIGS. 10A and 10B illustrate the effect of the tilt correction algorithm.
Figure 10B:
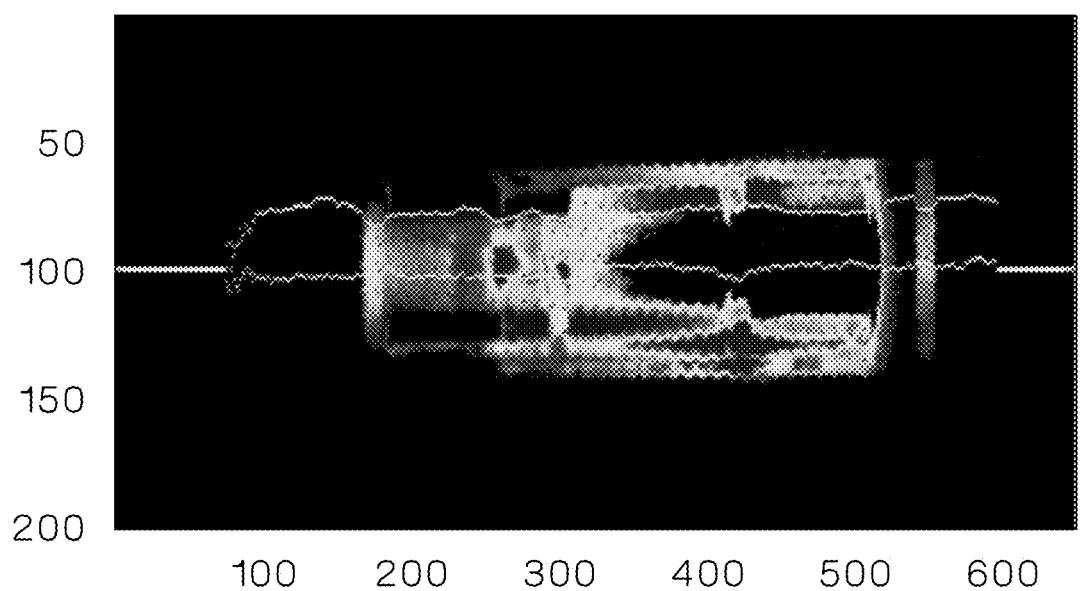

Next, in step 422, if the tilt angle is larger than a maximum tilt angle, a flag variable, FLAG_ANGLE_CORRECT, is turned on. This flag will be used in algorithm A4; when ON it will correct for the tilt, if OFF it will not make a correction. In step 424, if FLAG_ANGLE_CORRECT is turned on, the image will be corrected. This is an optional step to show the degree of correction before the termination of the connector is performed. FIG. 10 shows and example of tilt correction. In step 426, the algorithm ends and returns to the general flow chart shown in FIG. 4 and to step 320.

Figure 6:
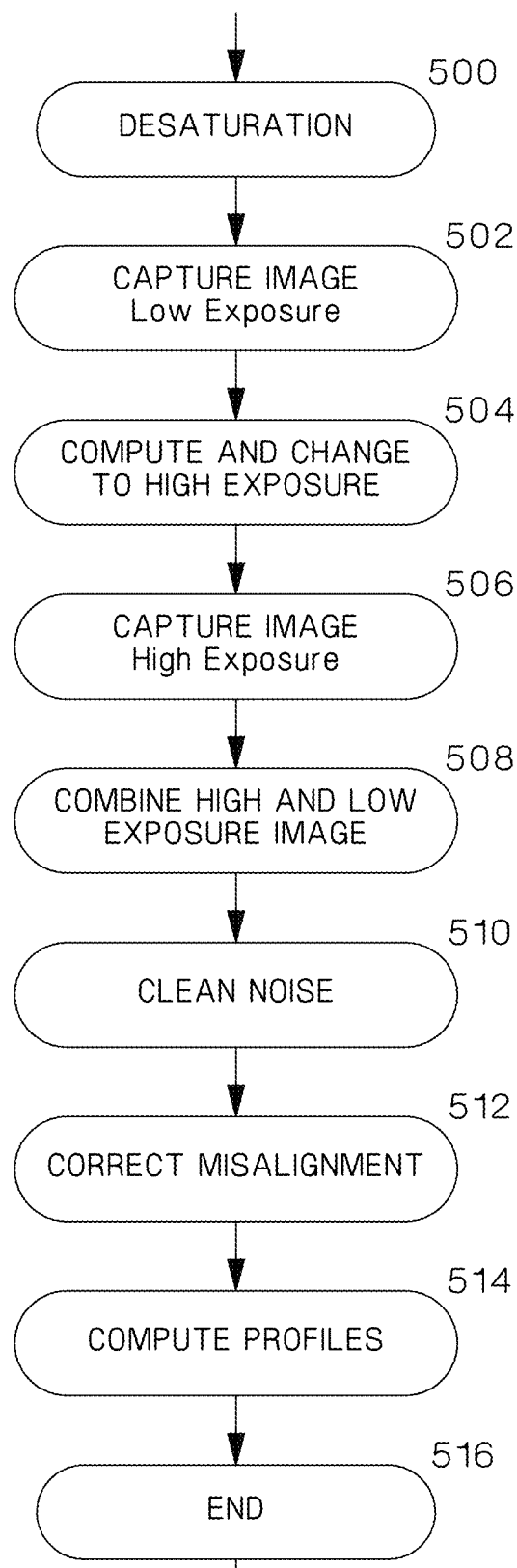
FIG. 6 illustrates a flow diagram representative of an exemplary Process Image algorithm.

Referring back to FIG. 4, in steps 320 the apparatus runs algorithm A4 which captures images with corrected background and enhanced dynamic range. To be more specific, image processing is required to extract the information from the acquired images in order to predict if the connector is ready to be terminated while the fiber is inserted, and after termination, to estimate the IL. In order to reduce the cost of the apparatus, an uncooled B&W CMOS camera with relative low resolution, e.g., 640×480 pixels, may be utilized. The effective number of bits per pixel is relative low (e.g., 8 bits). The algorithm illustrated by way of a flow chart in FIG. 6 is able to efficiently extract key information from the images captured by the camera. This information is used later for the ready to cam algorithm (RTC, A6) and for the IL estimation (algorithm A7).

FIG. 6 shows the flow diagram algorithm A4. Beginning in step 500, the algorithm finds the best exposure time that sets the levels inside the range of pixel levels obtained in step 300 of FIG. 4. For example, for an 8-bit per pixel B&W camera, the range of levels can be 200 to 255. A correct execution of this step is important to the other algorithms since an incorrect exposure time will produce underexposed or saturated images. The algorithm follows an iterative cycle which continuously modifies the exposure based on current maximum values in the image. For example, the new exposure is obtaining by multiplying the current exposure by a factor that is directly proportional to the maximum pixel level (e.g., 255 for an eight-bit camera) and inversely proportional to the current maximum level. After the correct exposure is obtained, the image is captured in step 502. Since the apparatus performs real-time background subtraction in order to operate without a cover under most of the indoor illumination conditions, ideally at least two images are captured during this step. First, the optical source is turned off, and an image is acquired and labeled as background image. Next, the optical source is turned on and a second image, labeled foreground image, is acquired. Finally, the background image is subtracted from the foreground image. As a result of this processing, the impact of the environmental lighting is reduced or minimized. The resultant image is labeled low exposure image.

Next in step 504, the exposure is set to the maximum value which, in most cases, produces saturation in at least one pixel. In step 506, the resultant image is captured in a similar way as described above for the low exposure image. The light source is turned off to capture a background image and turned on to capture a foreground image. The images are subtracted and the resultant image is stored and labeled high exposure image.

Figure 12A:
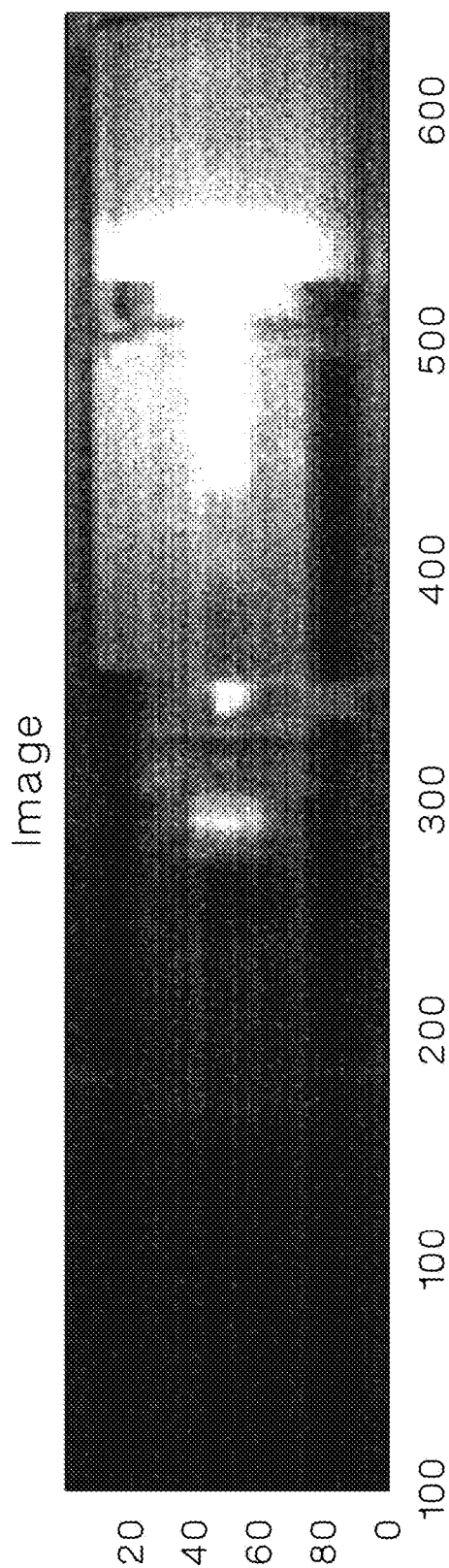
FIGS. 12A and 12B illustrate the results from the profile computation algorithm.
Figure 12B:
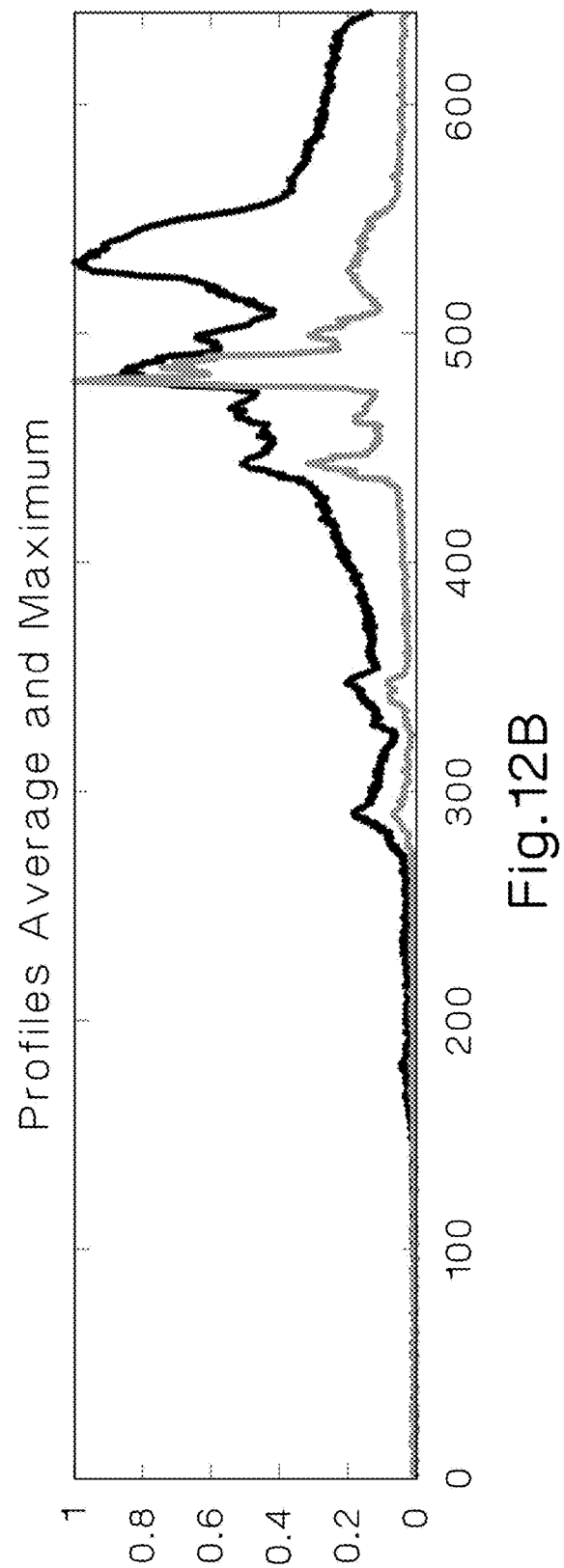

In step 508 both images are combined to produce an image with high dynamic range. The algorithm can use the following equation for the combination:

$$I_c(x, y) = \begin{cases} I_{HIGH}(x, y) & IF(I_{HIGH}(x, y) < \text{Threshold\_comb}) \\ \dfrac{I_{LOW}(x, y)}{\tau_{LOW}} \tau_{HIGH} & IF(I_{HIGH}(x, y) \geq \text{Threshold\_comb}) \end{cases} \quad (8)$$

where, $I_c(x, y)$ is the image array in the apparatus's memory, $\tau_{LOW}$ and $\tau_{HIGH}$ are the low exposure time (obtained in step 500), and the highest exposure time of the camera respectively. In equation (8), Threshold_comb is a predefined parameter loaded in step 300 of FIG. 3, which depends on the camera characteristics. An example for this combination is shown in FIG. 12.

Next in step 510, the effect of noise is reduced by using:

$$I_{c1}(x, y) = \begin{cases} I_c(x, y) & IF(I_c(x, y) \geq \text{NOISE\_TH}) \\ 0 & IF(I_c(x, y) < \text{NOISE\_TH}) \end{cases} \quad (9)$$

where, NOISE_TH was determined in step 316 using algorithm A2.

In step 512, the algorithm corrects for the misalignment detected by algorithm A3. For example, if there is a tilt in the image and if FLAG_ANGLE_CORRECT is ON, (see algorithm A3) the image is corrected. FIG. 10 shows an example for this correction. In step 514, the image is reduced from a 2-dimensional array to a one-dimensional array or vector, denominated here as a profile. This reduction is done to enable real-time computations of RTC and IL algorithms without requiring an expensive and/or power consuming processor. The profile shown in FIG. 12, as an example, are denominated profile average PA(x) and profile maximum PM(x), and are computed from the images I(x, y) from equation (2) using:

$$PA(x) \approx \text{mean}_y(I(x,y)_{c1})$$

$$PM(x) \approx \text{max}_y(I(x,y)_{c1}) \quad (10)$$

After computation, the profiles are stored in memory and in step 516, and the A4 algorithm ends and return control to other processes as shown in FIG. 4.

Referring back to the flow chart of FIG. 4, in step 322 algorithm A5 runs a check to determine if the optical source is sufficiently coupled to the connector under test. Insufficient optical coupling results in a low signal-to-noise ratio (SNR) and inaccurate IL estimations. To help determine the integrity of the connection, this algorithm evaluates the ratio of intensity levels of different regions of the connector. In order to estimate these ratios, it uses the profiles, PA and PM stored in memory from previous steps in the general method. As an example, the following equations can be used for the computation of ratios:

$$R\_PA_1 = \dfrac{\sum\limits_{[Region\_C]} PA(x)}{\sum\limits_{[Region\_B]} PA(x)} \quad (11)$$

$$R\_PM_1 = \dfrac{\sum\limits_{[Region\_C]} PM(x)}{\sum\limits_{[Region\_B]} PM(x)} \quad (12)$$

The position of the regions B and C are obtained from pre-loaded tables (obtained in step 304) for the type of connector. As an exemplary illustration, one can use the profiles shown in FIG. 12, where region B is the area close to the interface between the launch fiber and the beginning of field connector determined by x-pixels 300 to 400, and region C can be determined by x-pixels between 450 and 630. After the ratios are computed using equations (11) and (12) they are compared with pre-loaded thresholds. Depending on the comparison it will be determined if the connection between the launch fiber and the field connector is sufficiently good. If the connection is sufficiently good, a flag variable will be activated and a message can be displayed to show the status of the connection. Otherwise, a message to disconnect the source and clean may be displayed.

Referring back to FIG. 4, in step 328 the apparatus saves the profiles obtained in step 320 as initial connector profiles. For illustration purposes, the average maximum profiles at this step will be saved as PA1(x) and PM2(x).

Next, in step 330 the operator receives a message to insert the prepared field fiber into the connector and upon insertion of the connector, the apparatus continues the RTC algorithm A6 in steps 332 to 338.

More specifically, algorithm A6 is designed to assist the operator during the termination process. It outputs an indicator when the connector is ready to be cammed such that the splice is completed. In step 332 algorithm A4 is called to process the image and provide the profiles, PA(x) and PM(x). As explained earlier, algorithm A4 will capture, correct for background illumination, correct for misalignments, and enhance the dynamic range before returning the profiles.

In step 334 the centroids of both profiles and their ratios for certain regions are computed in a similar way as described in algorithm A5. The regions of importance for the RTC algorithm are preloaded for each connector type, e.g., LC or SC. These regions may be determined from statistical analysis of a large population of connectors. FIG. 13 shows an example for 4 SC connectors labeled SC1-SC4.

Three stages of the RTC image analysis are shown in FIG. 13. In part (a) the field fiber is only partially inserted and the connector is not ready to be cammed, avoiding a high IL (>1 dB) condition. In part (b), the field fiber is in close proximity to the internal stub fiber, but not yet in the optimum position. In part (c) the images show when the field fiber is fully inserted and in physical contact with the internal stub fiber. Once this condition is achieved, the connector is ready to be cammed. For a connector cammed during this condition, there is a high likelihood that that the IL is very low (e.g., <0.3 dB).

FIG. 13 also shows that the peak levels of the radiation patterns shift from region C to D as the field fiber approaches the stub fiber. This visual effect can be quantified with the centroid of the image or with the ratio of average levels between regions C and D. The computational method for the later metric is given by:

$$RTC\_1 = \frac{\sum\limits_{[Region\_D]} PA(x)}{\sum\limits_{[Region\_C]} PA(x)} \quad (13)$$

To provide continuous feedback to the user, in step 336 the apparatus can communicate real time values of the ratio or centroid by transmitting the calculated numerical values or pictorial representations to a display, in the form of graphical images or progress bars.

In 338, the algorithm compares the ratios and centroid with preloaded thresholds (loaded in 304 for the type of connector). This threshold may come from a statistical analysis for each type of connector. If the centroid is higher than the centroid threshold and the RTC condition is achieved, the algorithm will proceed to step 340. Otherwise, it will return to step 332 and the RTC cycle will repeat. In step 340, the profiles are stored as PA2(x) and PM2(x) and thereafter in step 342 a message and/or image can be displayed indicating that the connector termination can be completed by camming or rotating the mechanical splice mechanism. Once done so, the RTC process is ended in step 344 with the last profile from the RTC process being stored in step 346.

Next, in step 348, algorithm A5 again verifies that the optical source is properly coupled to the connector. If not, a flag variable is activated and a message is displayed instructing the user to reposition and or clean the mating points. If algorithm A5 verifies a properly coupled optical source, step 352 captures and stores a new set of IL profiles. Then, in step 354 the connector parameters, (connector profiles, RTC profiles, and IL profiles) are saved in order to maintain records of the installation process.

Figure 14:
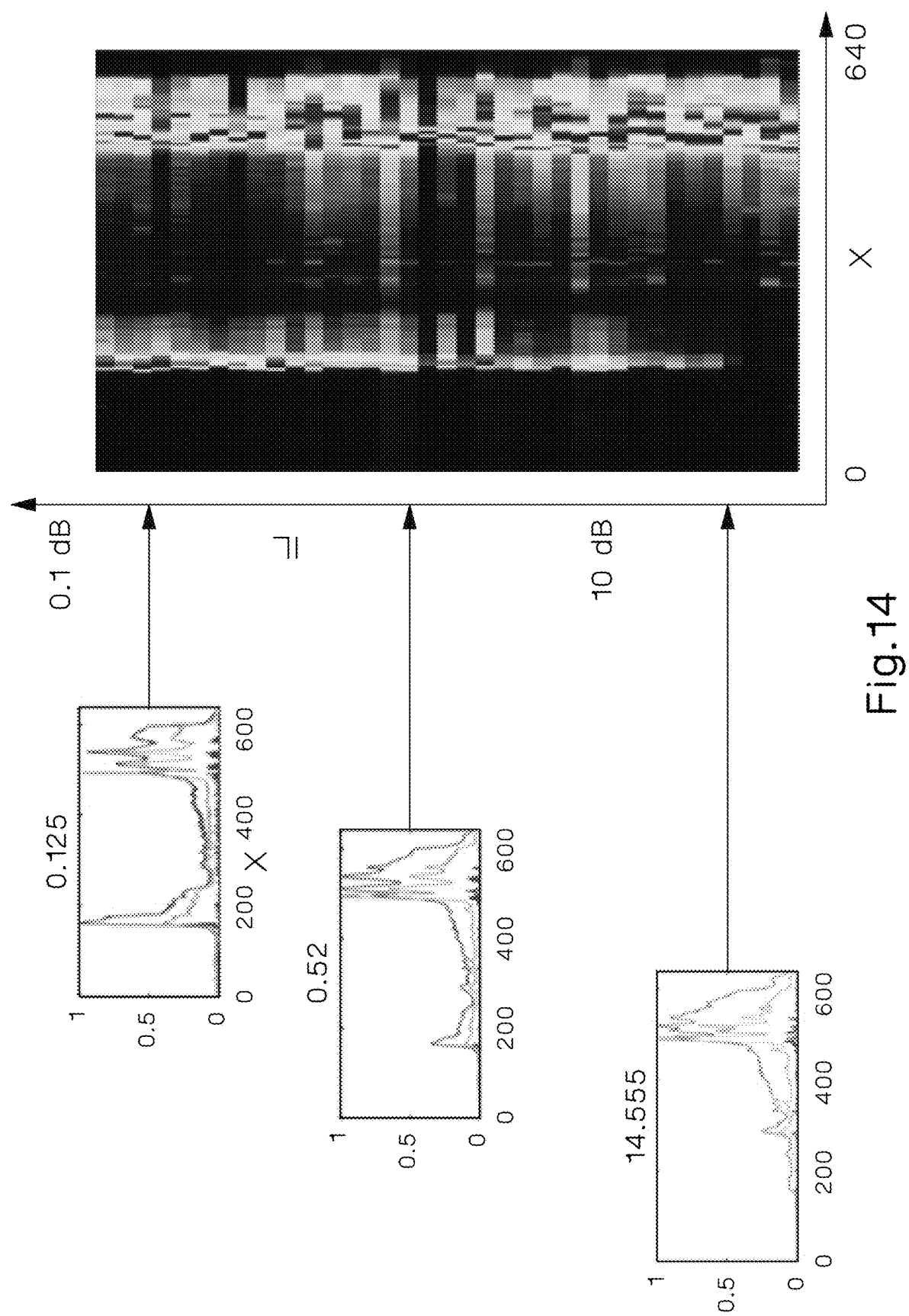
FIG. 14 illustrates the correlation of profile shape changes with IL.
Figure 17:
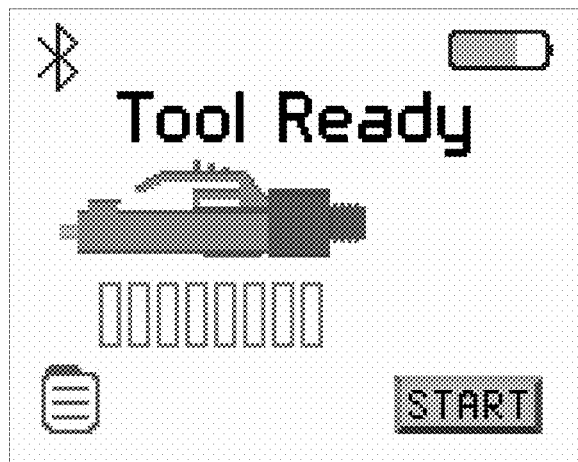
Figure 18:
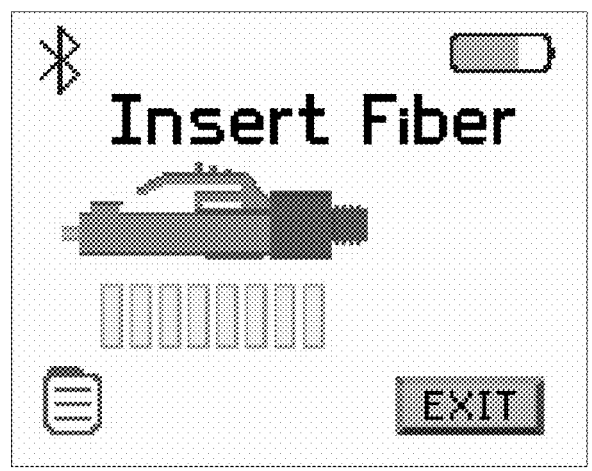
FIG. 18 illustrates a displayed image for ready-to-cam when fiber is not inserted (not optimum position).
Figure 19:
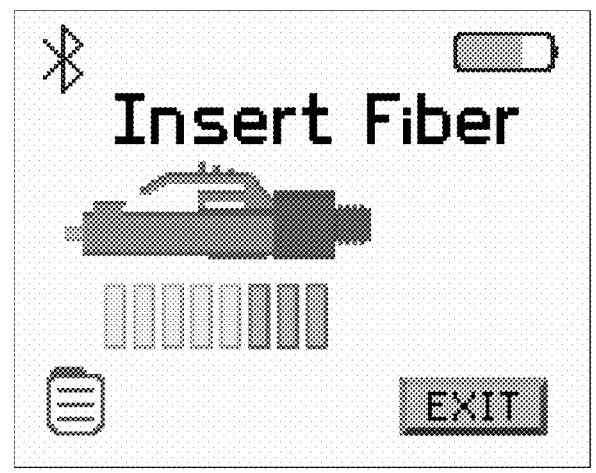
FIG. 19 illustrates a displayed image with the insertion of field fiber is detected.
Figure 20:
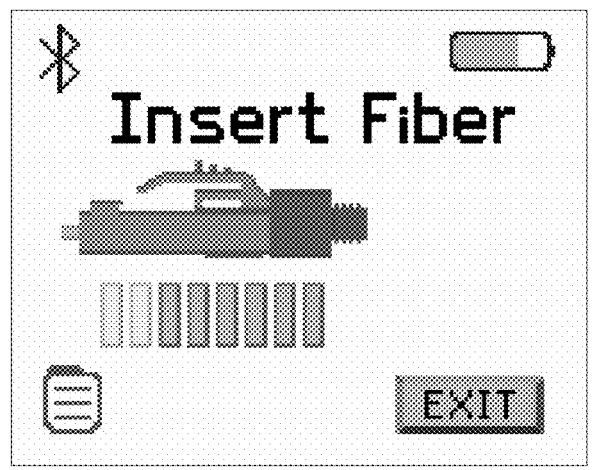
FIG. 20 illustrates a displayed image for ready-to-cam when fiber being inserted (close proximity).
Figure 21:
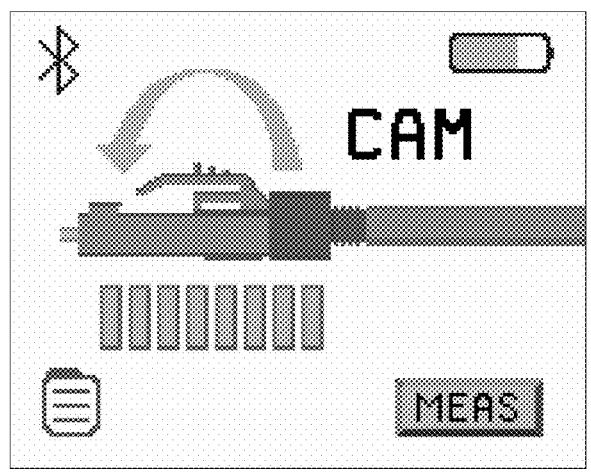
FIG. 21 illustrates a displayed image for ready-to-cam when fiber being inserted (ready to cam).

Thereafter, in step 356 algorithm A7 is executed to estimate the IL of the connector. This algorithm is utilized to estimate IL based on captured images at different stage of the installation process. The algorithm is based on statistical studies of a large population of connectors of different types, such as LC and SC for single-mode and multimode connectors. The insertion loss value determined pursuant to this algorithm will be estimated using:

$$IL_{Est} \approx -10K\_IL_1 \log_{10}\left(1 - \frac{K\_IL_2(SumC_3 - K\_IL_3 SumB_3)}{\max(SumC_1, SumC_2) - K\_IL_4 SumB_1)}\right) + \quad (14)$$
$$K\_IL_0 + K\_IL_5 \frac{SumC_3}{SumB_3}$$

where, K_IL1, K_IL, K_IL2, K_IL3, K_IL4, and K_IL5 are factory calibration factors loaded in step 304, and SUM_C1, SUM_C2, SUM_C3 and SUM_B3 are defined as:

$$SUMB_i = \sum_{[Region\_B_i]} PA(x) \quad (15)$$

$$SUMC_i = \sum_{[Region\_C_i]} PA(x) \quad (16)$$

where, i is an index that can take values from 1 to 3. The fundamentals of this algorithm are described below and an exemplary illustrations of the algorithm performance are shown in FIG. 14-16.

In once the IL is estimated, in step 358 the value returned by algorithm A7 is compared against the specified limit from default tables loaded in step 302, or against values entered by the operator in step 308. If the IL is lower than the specified limit (e.g., 0.75 dB) a true logic condition is generated and pass indicator 362 will be displayed along with the estimated IL value on the display screen. If a false condition occurs, a "fail" message will be displayed in step 360. In the earlier case, the IL results are saved in step 364 and the process ends at step 366 where the tool enters a "Tool Ready" stage essentially equivalent to the stage after step 306. In the latter case, the process proceeds directly to step 366.

After finalizing the termination process the profiles at three stages of the installation, as well as the IL and time are saved. This information can be used later for statistical analysis. The advantage of saving the profiles instead of the images is that the memory requirements on the tool can be reduced at least 2 orders of magnitude and data transmission from apparatus to a mobile device can become faster.

The disclosed apparatus can operate in stand-alone mode during the complete installation. The installer ID, time, location and profiles for each connector can be stored in the apparatus. However, in order to perform technical and managerial analysis of the installation project, the aggregate data from several apparatuses maybe required. For this purpose, the apparatus can include functionalities to connect to a mobile device in a wired or wireless configuration, e.g., Bluetooth. The mobile device can send data to update the tool tables and update the firmware among other functionalities. The mobile device can also upload the data stored in the tool or transmit to a centralized data base where analysis can be performed.

A computer or mobile device with access to the aggregate data of one or more installation projects can analyze the data and provide valuable information to the installer, customer, or connector supplier to be used to improve:

a) Performance—For example, it can report, histograms of IL, per operator, location and type of connector. It can identify which installers need more training. It can identify risks based marginal pass connections timely before the installation phase of the project ends.

b) Productivity—Since the installation process is monitored, the aggregate data can be used to estimate productivity, skill per each operator, or crew. This information can help to plan future projects with more accuracy in the time estimation and better resource assignation. It can also monitor the usage of connectors and procure connector inventory in advance.

c) Troubleshooting—Since the profiles of each connector are stored at different stages, there is good information to determine if a defect in a connection is due to the connector itself, the installation method, or apparatus issues.

Figure 22:
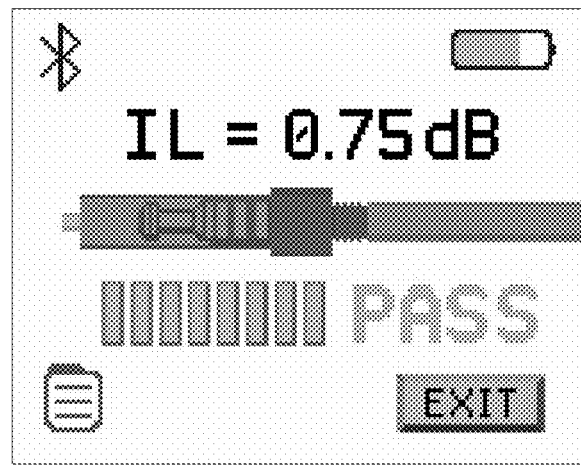
FIG. 22 illustrates a displayed image after IL estimation.

In some cases, it may be desirable to have a computer control, display, and provide sound outputs accordingly to the status of the termination process. In the general method shown in FIG. 4, the display and sound algorithm is executed in steps 306, 310, 314, 326, 330, 336, 342, 350, and 360. FIGS. 17 to 22 show some examples of the images to be displayed. For example, during the RTC algorithm (A7) FIGS. 18 to 20 can show figures of the connector with a color bar indicator representing how close the field fiber is to the stub fiber. At the optimum position, the display will show (like in FIG. 21) that the fiber is ready to terminate or cam and it will show a message to rotate the connector. Alternatively, when the installation conditions make it difficult to see the display, a sound from a speaker in the apparatus or a headphone (wired or wireless) connected to the apparatus can emit a sound to indicate if the connector is ready to terminate. FIG. 22 shows an exemplary image of a display after the IL is estimated by the apparatus using algorithm A7 in step 356.

Note that while this invention has been described in terms of several embodiments, these embodiments are non-limiting (regardless of whether they have been labeled as exemplary or not), and there are alterations, permutations, and equivalents, which fall within the scope of this invention. Additionally, the described embodiments should not be interpreted as mutually exclusive, and should instead be understood as potentially combinable if such combinations are permissive. It should also be noted that there are many alternative ways of implementing the methods and apparatuses of the present invention. It is therefore intended that claims that may follow be interpreted as including all such alterations, permutations, and equivalents as fall within the true spirit and scope of the present invention.

What is claimed is:

1. A method for evaluating the optical insertion loss of a mechanical splice joint of two optical fibers with a laser source, a digital video camera, a microcontroller or processor, electronic circuitry, resident memory, and means for coupling the laser output signal to one of the optical fibers to be spliced comprising:
    upon initiation by a user automatically performing the steps of:
    checking for ambient light;
    estimating the level of noise by analyzing an area of a sensor that is not illuminated by external sources and setting a noise threshold;
    checking self-alignment by taking a foreground image of the mechanical splice joint with the laser source turned on and taking a background image of the mechanical splice joint with the laser source turned off, subtracting the background image from the foreground image to obtain a resultant image, setting all pixels with levels below the noise threshold to zero, selecting a region of interest of the mechanical splice joint, computing a centroid and a width of the resultant image based on the region of interest, estimating a tilt and if the tilt is above a certain threshold, compensating for the tilt; and
    processing the resultant image.

2. The method of claim 1 wherein processing the image includes taking a low exposure image, taking a high exposure image, combining the low exposure image with the high exposure image to get a second resultant image, reducing noise by setting pixels below a certain threshold to zero, compensating for tilt if the tilt is above a certain threshold, converting the second resultant image to a profile, and storing the profile.

* * * * *